(12) United States Patent
Halling

(10) Patent No.: US 8,152,172 B2
(45) Date of Patent: Apr. 10, 2012

(54) RESILIENT SEAL

(75) Inventor: Horace P. Halling, Durham, CT (US)

(73) Assignee: American Seal and Engineering Company, Inc., Orange, CT (US)

( * ) Notice: Subject to any disclaimer, the term of this patent is extended or adjusted under 35 U.S.C. 154(b) by 0 days.

(21) Appl. No.: 12/825,566

(22) Filed: Jun. 29, 2010

(65) Prior Publication Data

US 2010/0259016 A1 Oct. 14, 2010

Related U.S. Application Data

(62) Division of application No. 11/813,879, filed as application No. PCT/US2005/003487 on Jan. 28, 2005, now abandoned.

(51) Int. Cl.
*F16J 15/02* (2006.01)
(52) U.S. Cl. ........................................................ 277/644
(58) Field of Classification Search .......... 277/643–644, 277/647–649, 626–627
See application file for complete search history.

(56) References Cited

U.S. PATENT DOCUMENTS

| | | | | |
|---|---|---|---|---|
| 4,336,943 | A | * | 6/1982 | Chaplin ........................ 277/643 |
| 5,240,263 | A | * | 8/1993 | Nicholson ..................... 277/614 |
| 5,249,814 | A | * | 10/1993 | Halling ......................... 277/654 |
| 6,568,692 | B2 | * | 5/2003 | Kolodziej et al. ............. 277/614 |

* cited by examiner

*Primary Examiner* — Vishal Patel
(74) *Attorney, Agent, or Firm* — Raymond A. Nuzzo

(57) ABSTRACT

An annular, axial seal has a central section having a first linear section that has first and second ends. The seal has a curved, first portion that is contiguous with the first end of the first linear section and extends to a first end. The seal includes a second portion that is contiguous with the second end of the first linear section. The second portion includes an arcuate portion and a second linear section contiguous with the arcuate portion wherein the arcuate portion is between the first linear section and the second linear section. The second linear section is located across from the first linear section. A curved end portion is contiguous with the second linear section wherein the second linear section is between the arcuate portion and the curved end portion. The curved end portion extends to a second end that is located across from the first linear section.

5 Claims, 23 Drawing Sheets

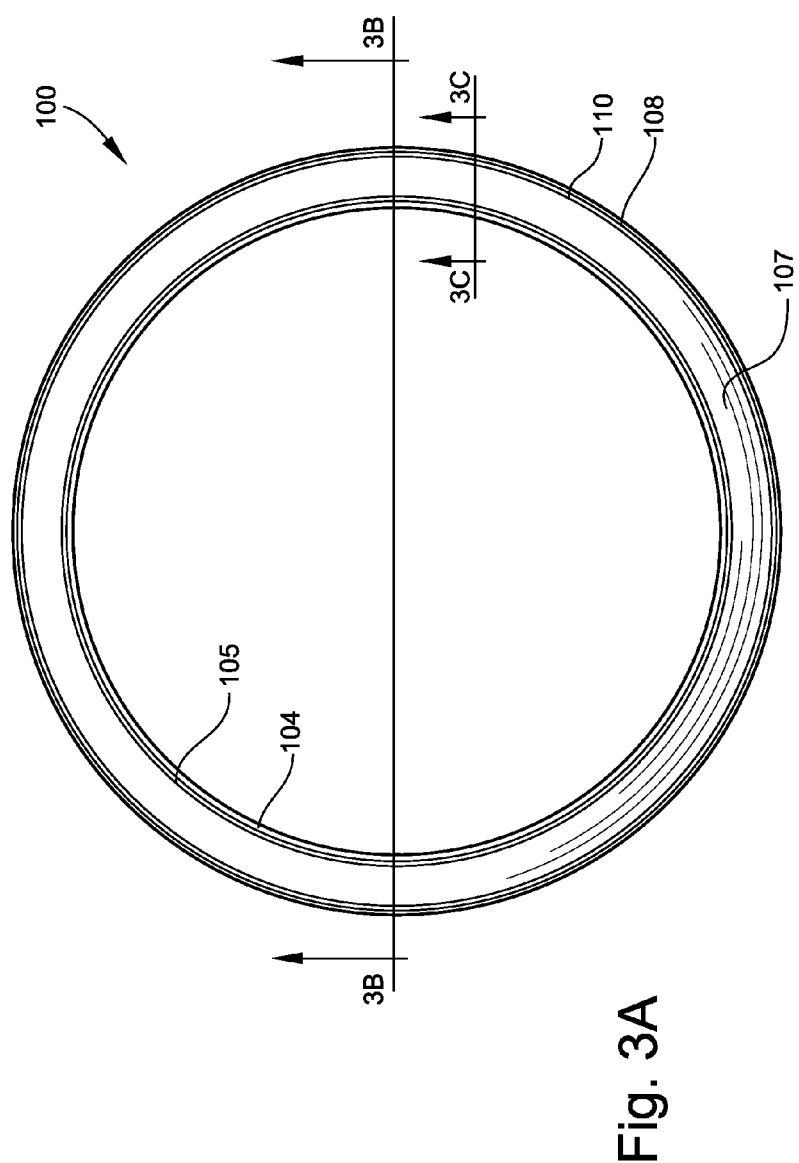
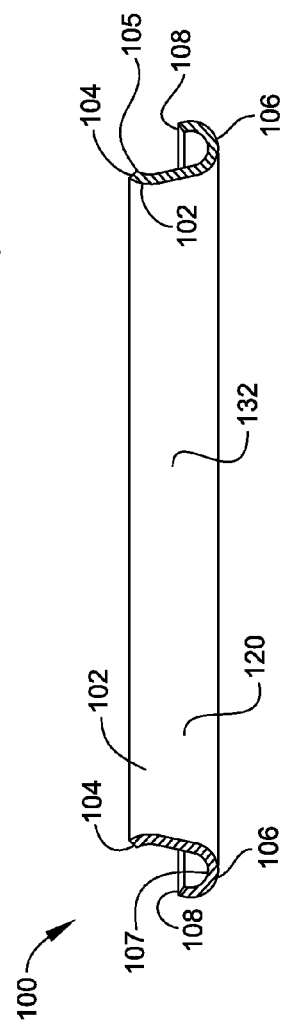
Fig. 3A
Fig. 3B

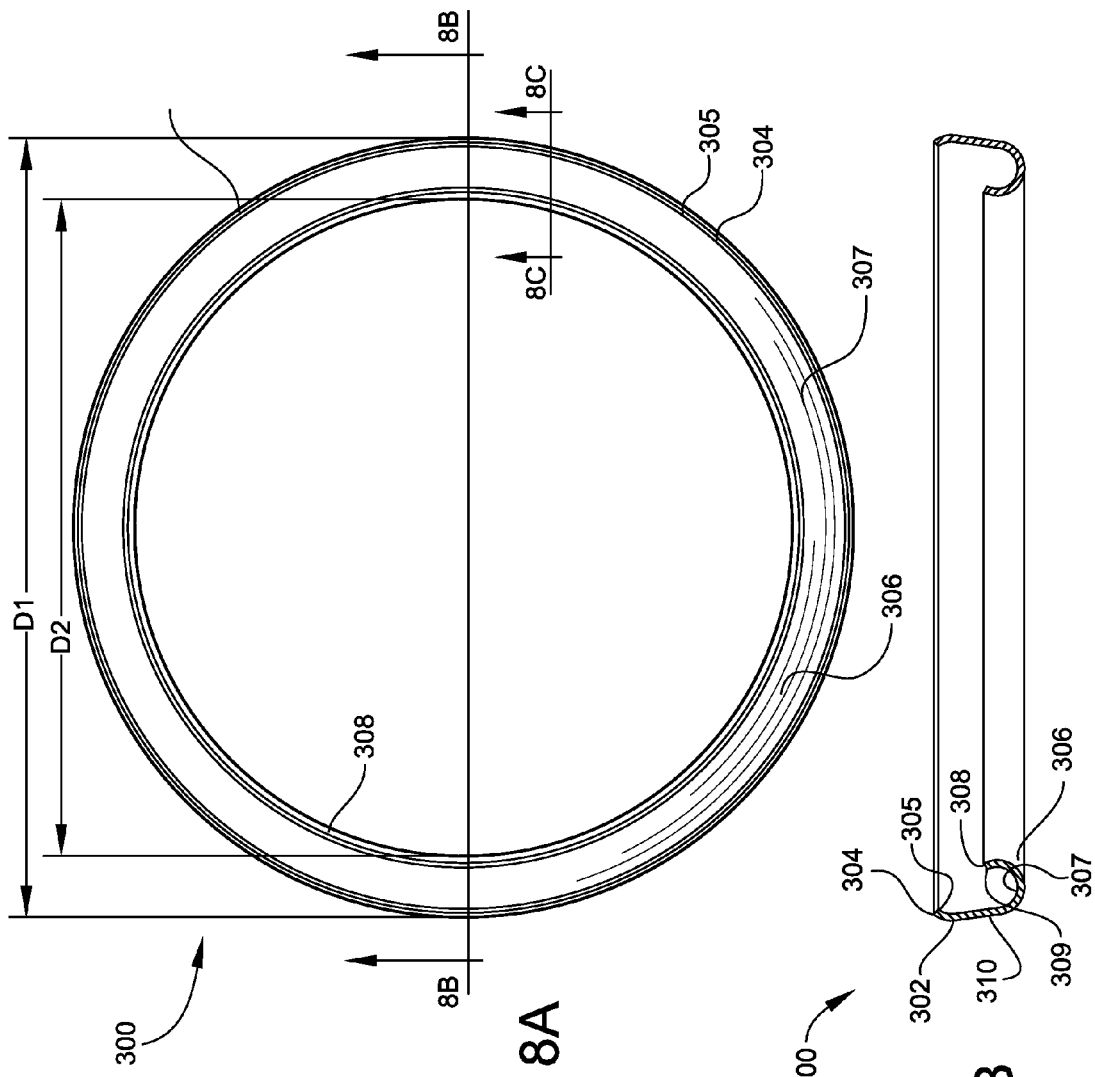

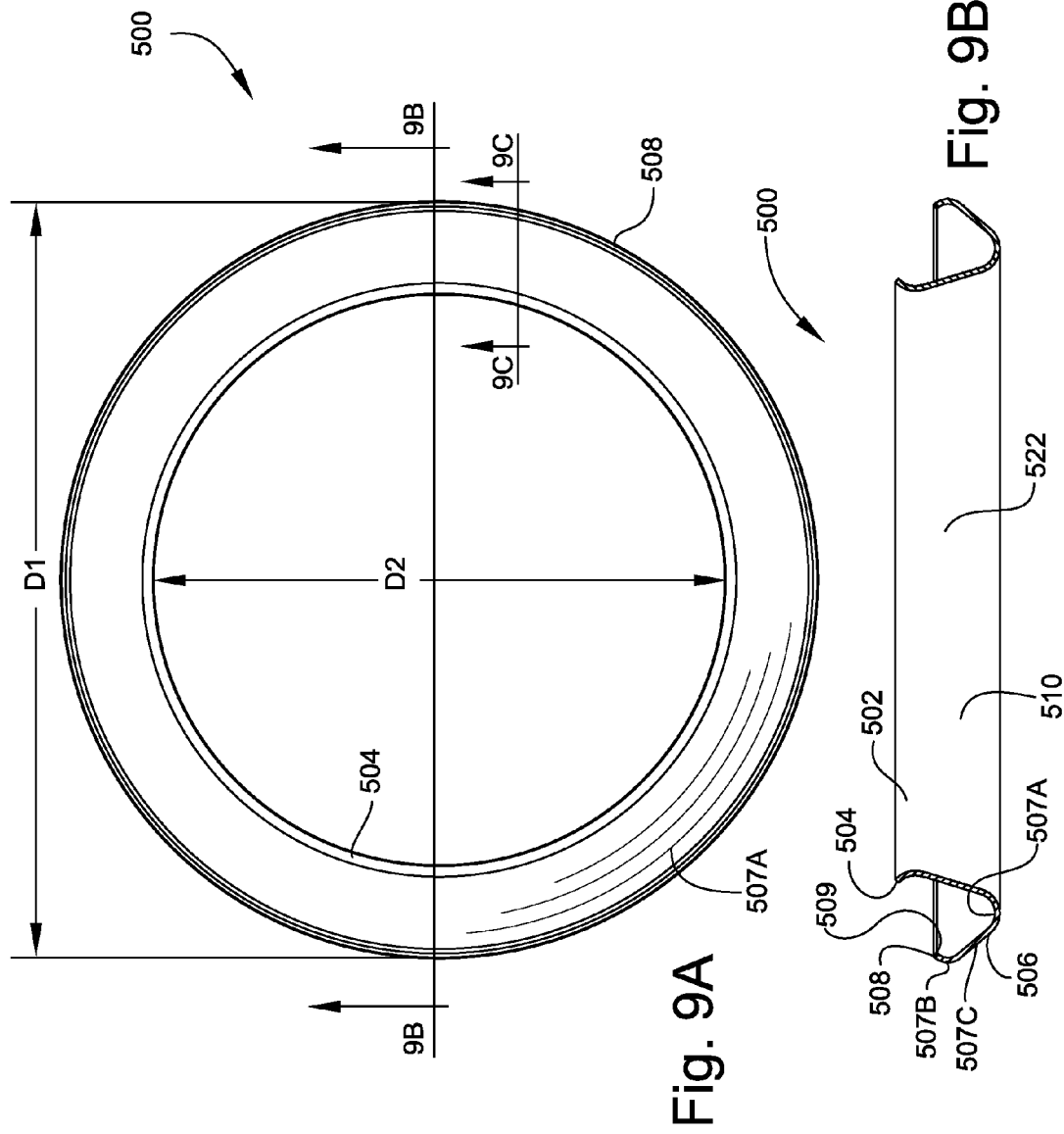

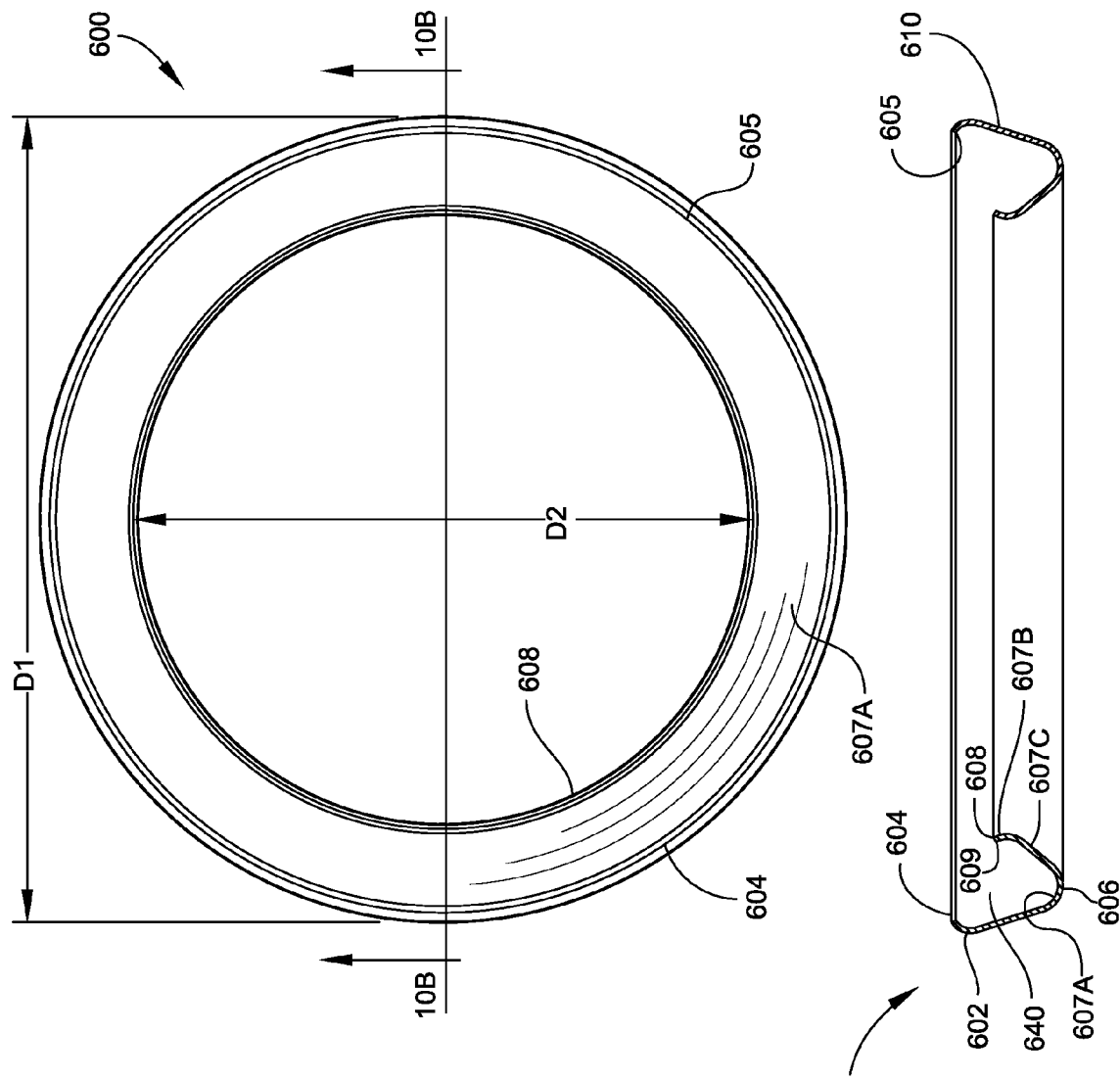

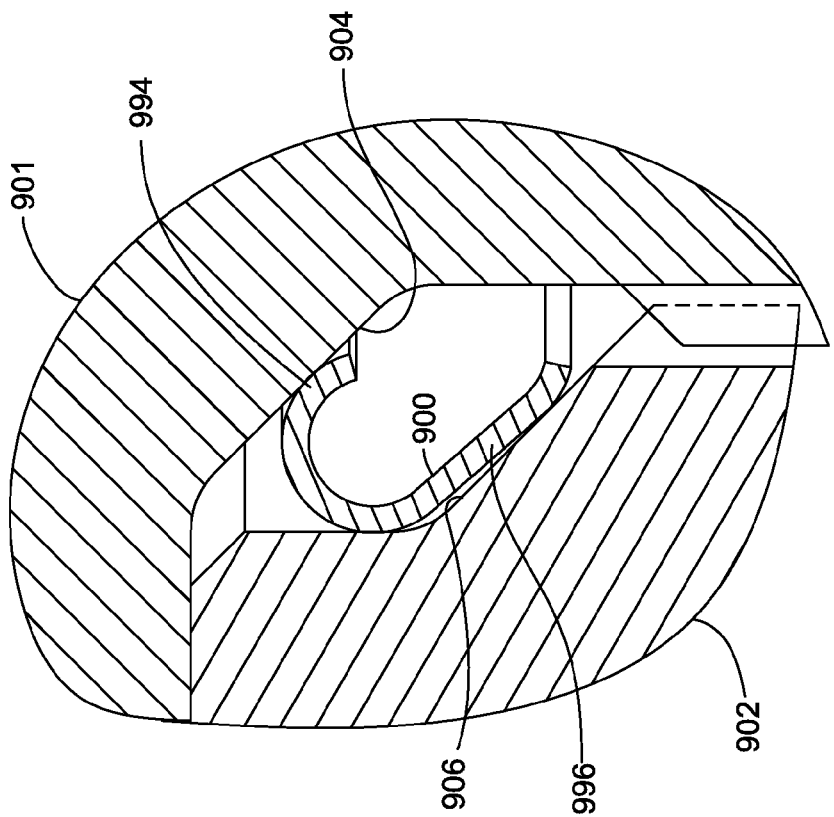
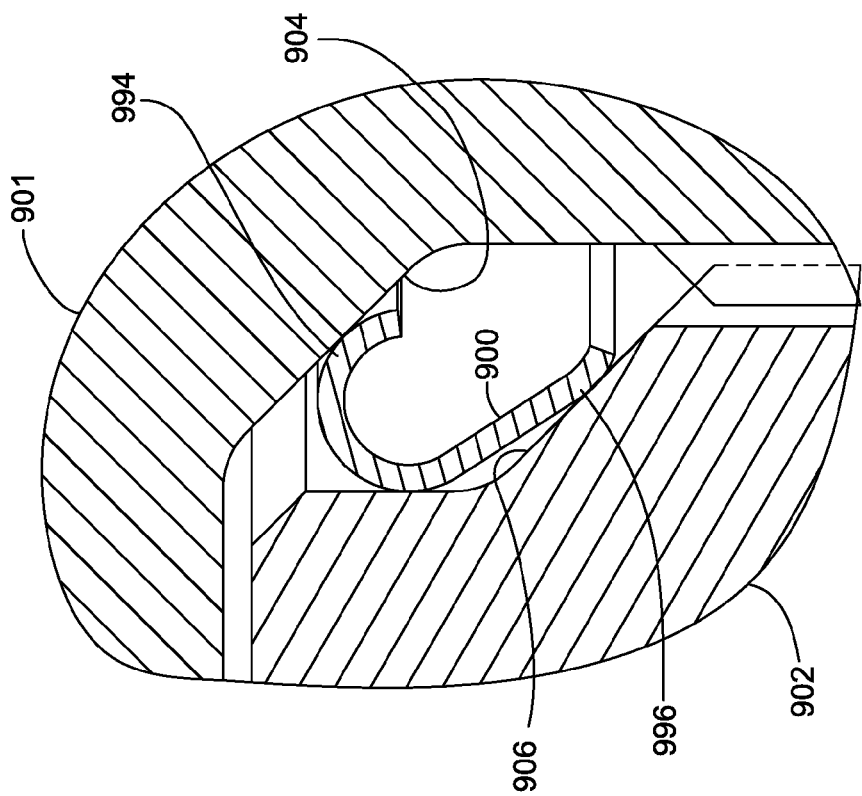
Fig. 13B
Fig. 13A

RESILIENT SEAL

CROSS-REFERENCE TO RELATED APPLICATIONS

This application is a divisional application of U.S. application Ser. No. 11/813,879, filed Jul. 13, 2007 now abandoned, which application claims priority to international application no. PCT/US2005/003487, filed Jan. 28, 2005. The entire disclosure of the aforesaid U.S. application Ser. No. 11/813,879 is hereby incorporated by reference.

TECHNICAL FIELD

The present invention generally relates to annular seals.

BACKGROUND ART

In applications wherein it is necessary to contain pressurized fluids, resilient metallic seals are used when elastomeric and polymeric materials cannot be used because of extremely high pressures, high temperatures and/or aggressive media. Resilient, metallic seals are produced in different configurations that are designed to meet a variety of operating requirements.

One prior art resilient, metallic seal is known as the axial C-seal. The C-seal, which is available in three basic orientations, was developed as an improvement in flexibility over the hollow metal O-ring. The axial C-seal, which is intended for sealing the space between two concentric cylindrical surfaces, is shown in FIGS. 1A and 1B. As shown in cross-section in FIG. 1A, prior art axial C-seal 10 has an arcuate portion 12, outer sealing surface 16 and inner sealing surface 14. These features are also shown in FIG. 1B which is an enlarged view of a portion of the view of FIG. 1A. Circumferential lines passing through the quadrant points of the section shown in FIG. 1B are known as sealing lines. As with the metal O-ring, the axial C-seal may be used to seal gaps between cylindrical surfaces in mainly static applications.

Other prior art seals have been developed to perform these functions described above. Some of these seals are disclosed in U.S. Pat. Nos. 4,457,523, 4,854,600, 5,799,954, 6,257,594, and 6,446,978. These prior art seals serve their purpose, but they exhibit limitations when required to be pressure-energized and are not capable of accommodating significant lateral misalignments of the cylindrical surfaces to be sealed.

Seals, including prior art axial C-seals, are typically used in couplings and other devices that are part of fluid transmission or containment systems. In the example of a coupling, a rigid hollow proboscis or probe is typically inserted into a hollow receptacle in the fluid transmission system. The receptacle contains a sealing ring or multiple sealing rings which are dilated by insertion of the probe. This dilation creates the required contact stresses for sealing. The contact stresses achieve fluid containment between the two bodies to be sealed together. In some instances, the probe is forced into the receptacle without the centerlines or axes of the two components being properly aligned, as a result of imperfect field installation practices. When this occurs, the probe may displace one side of the axial C-seal to an extent at which the ring may not be sufficiently resilient to elastically deform. As a result, a gap may be formed on the opposite side which results in leakage of fluid when the joint is pressurized.

Some prior art seals, when used to seal the joint of two cylindrical surfaces that are subject to vibrations, have been known to "walk" along the cylindrical surfaces. This is the result of the prior art seals merely lightly engaging both cylindrical surfaces. The "walking" of the seal results in a back-and-forth movement of the seal which causes excessive wear of the seal and the cylindrical surfaces it engages.

Another disadvantage of many prior art seals is poor reliability. This causes problems when repeated disengagements and insertions of probes are necessary.

A further disadvantage is that some pressure-energized prior art seals are extensively plastically deformed at installation and have little elastic recovery (i.e. springback) from their maximum compressed state, usually less than 3% of their free or uncompressed height.

What is needed is a new and improved seal that overcomes the aforesaid deficiencies and problems of the prior art seals.

DISCLOSURE OF THE INVENTION

The present invention is directed to a seal for the containment of high or moderate pressure fluids and gases at temperatures ranging from cryogenic to relatively high levels. The seal has an overall generally "J" shaped or hook-shaped cross-section. Specifically, the seal of the present invention is an annular lip seal that has the capability to exhibit superior performance generally and especially when the two objects that must be sealed together experience lateral offset, angular misalignment or axial misalignment.

Thus, in one embodiment, the present invention is directed to an annular seal having a generally "j" shaped cross-section and comprising a first end portion having a first distal end, a generally curled second end portion that extends to a second distal end, and a central body portion between and contiguous with the first and second end portions. The annular seal has a first side and an opposite second side. The second end portion curls in a first direction in accordance with a predetermined radius such that the second distal end is located across from the first side of the annular seal and the first and second distal ends do not face each other.

In another embodiment, the present invention is directed to an annular seal comprising a first side and an opposite second side, a generally frustro-conical central body portion having opposite ends, a first end portion contiguous with one of the opposite ends of the generally frustro-conical central body portion, and a generally curled second end portion contiguous with the other of the opposite ends of the generally frustro-conical central body portion. The first end portion has a first distal end. The second end portion extends to a second distal end. The second end portion curls in a first direction in accordance with a predetermined radius such that the second distal end is located across from the first side of the annular seal and the first and second distal ends do not face each other.

In another embodiment, the present invention is directed to an annular seal having a generally hook-shaped cross-section, a first side and a second opposite side. The annular seal comprises a first end portion having a first distal end, a generally curled second end portion that extends to a second distal end, and a central body portion between and contiguous with the first and second end portions. The second end portion curls in a first direction in accordance with a predetermined radius such that the second distal end is located across from the first side of the annular seal and the first and second distal ends do not face each other.

In a further embodiment, the present invention is directed to an annular, metallic seal comprising a first side and an opposite second side, a generally frustro-conical central body portion having opposite ends, a first end portion contiguous with one of the opposite ends of the generally frustro-conical central body portion, and a curled second end portion contiguous with the other of the opposite ends of the generally frustro-conical central body portion. The first end portion has a first distal end. The second end portion extends to a second distal end. The annular seal has a thickness that tapers in the direction of the first distal end. The first distal end is slightly angulated in a first direction. The second end portion curls in the first direction in accordance with a predetermined radius such that the second distal end is located across from the first side of the annular, metallic seal and the first and second distal ends do not face each other.

In yet a further embodiment, the present invention is directed to a resilient, annular seal that comprises a first linear section consisting of a first end and a second end, a first side in a first plane and an opposite second side in a second plane. The second plane is substantially parallel to the first plane, wherein the first linear section does not have any inflection points formed therein. The annular axial seal further comprises a first portion contiguous with the first end of the first linear section. The first portion is curved with respect to the first linear section and in accordance with a first predetermined radius such that the first portion breaks the first plane. The first portion extends to a first distal end. The annular axial seal further comprises a second portion contiguous with the second end of the first linear section. The second portion comprises a curved portion that is contiguous with the second end of the first linear section and which curls in accordance with a second predetermined radius, a second linear section contiguous with the curved portion such that the curved portion is between the first linear section and the second linear section, and a curved end portion contiguous with the second linear section such that the second linear section is between the curved portion and the curved end portion. The curved end portion extends to a second distal end. The curved end portion curls inward in accordance with a third predetermined radius such that the second distal end is located across from the first side of said first linear section by a predetermined distance and the first and second distal ends do not directly face each other.

Further features and advantages of the present invention will appear herein below.

BRIEF DESCRIPTION OF THE DRAWINGS

The foregoing features of the present invention will become more readily apparent and may be understood by referring to the following detailed description of illustrative embodiments of the present invention, taken in conjunction with the accompanying drawings, in which:

FIG. 3A is a plan view of a seal in accordance with another embodiment of the present invention.

FIG. 3B is a side view, in longitudinal section, taken along line 3B-3B of FIG. 3A;

FIG. 8A is plan view of a seal in accordance with another embodiment of the present invention;

FIG. 8B is a side view, in longitudinal section, taken along line 8B-8B of FIG. 8A;

FIG. 9A is a plan view of a seal in accordance with a further embodiment of the present invention;

FIG. 9B is a side view, in longitudinal section, taken along line 9B-9B of FIG. 9A.

FIG. 10A is a plan view of a seal in accordance with another embodiment of the invention;

FIG. 10B is side view, in longitudinal section, taken along line 10B-10B of FIG. 10A;

FIGS. 13A and 13B are cross-sectional views illustrating the installation of a seal in accordance with another embodiment of the present invention;

BEST MODE FOR CARRYING OUT THE INVENTION

The ensuing description makes reference to drawings shown as FIGS. 1-16. These figures show various embodiments of the present invention. The figures are not drawn to scale.

The seal of the present invention is an axial/radial seal that may be used in low speed, dynamic applications wherein relative axial motion between two concentric cylindrical surfaces is caused, for example, by thermal expansion. The seal of the present invention can also accommodate relative radial expansion and some eccentricity and/or angular misalignment of the two cylinders as well as rotational displacements. Specifically, the seal of the present invention combines a relatively rigid, sealing contact circle, for engagement with one of the cylindrical surfaces, and a highly flexible lip seal for slidably engaging the other cylindrical surface. This particular structure of the seal of the present invention ensures that the seal is restrained against axial and other movement with respect to one cylindrical surface while permitting low-resistance motion of the other cylindrical surface.

Figure 1A:
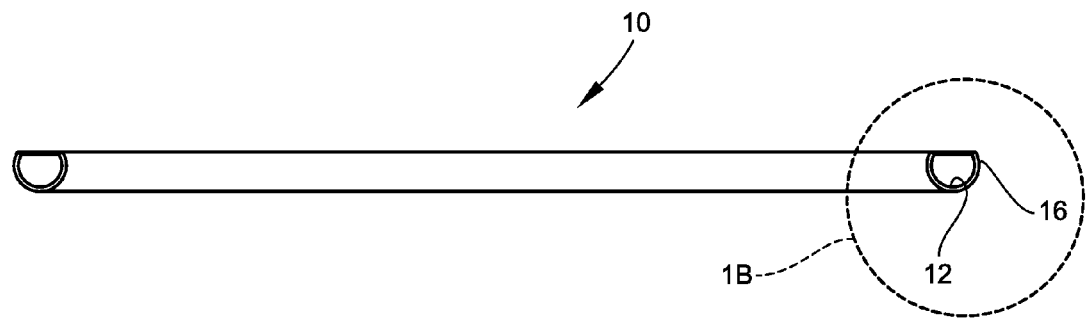
FIG. 1A is a side view, in longitudinal section, of a prior art axial C-seal.
Figure 1B:
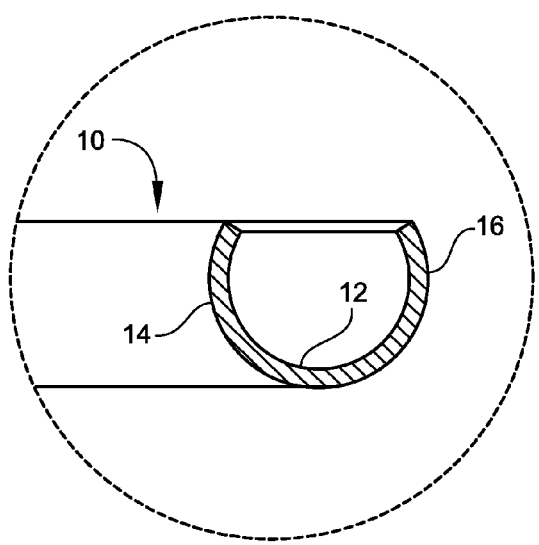
FIG. 1B is an enlarged view of a portion of the view shown in FIG. 1A.
Figures 2A, 2B:
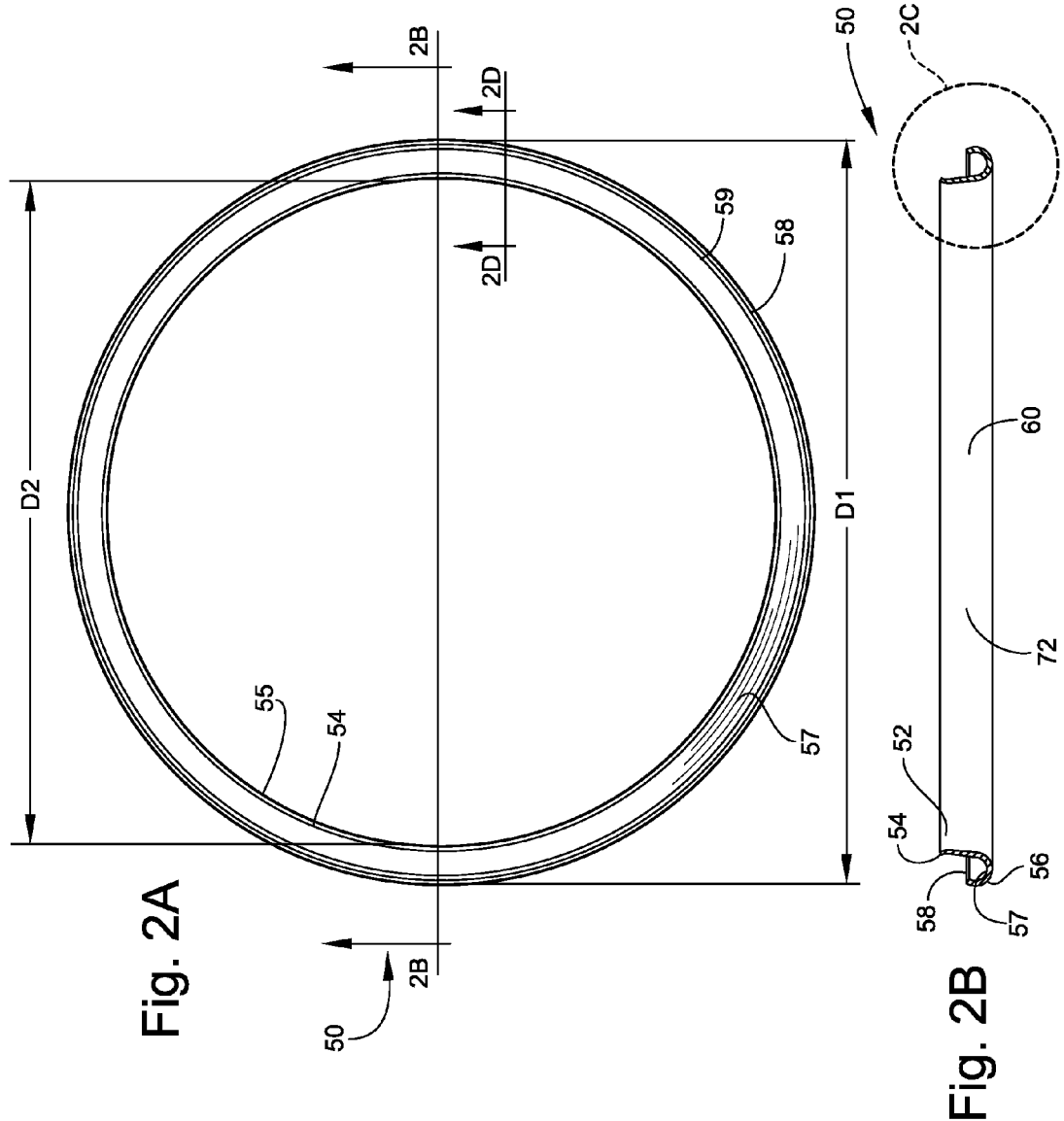
FIG. 2A is plan view of a seal in accordance with one embodiment of the present invention.
FIG. 2B is a side view, in longitudinal section, taken along line 2B-2B of FIG. 2A.
Figure 2C:
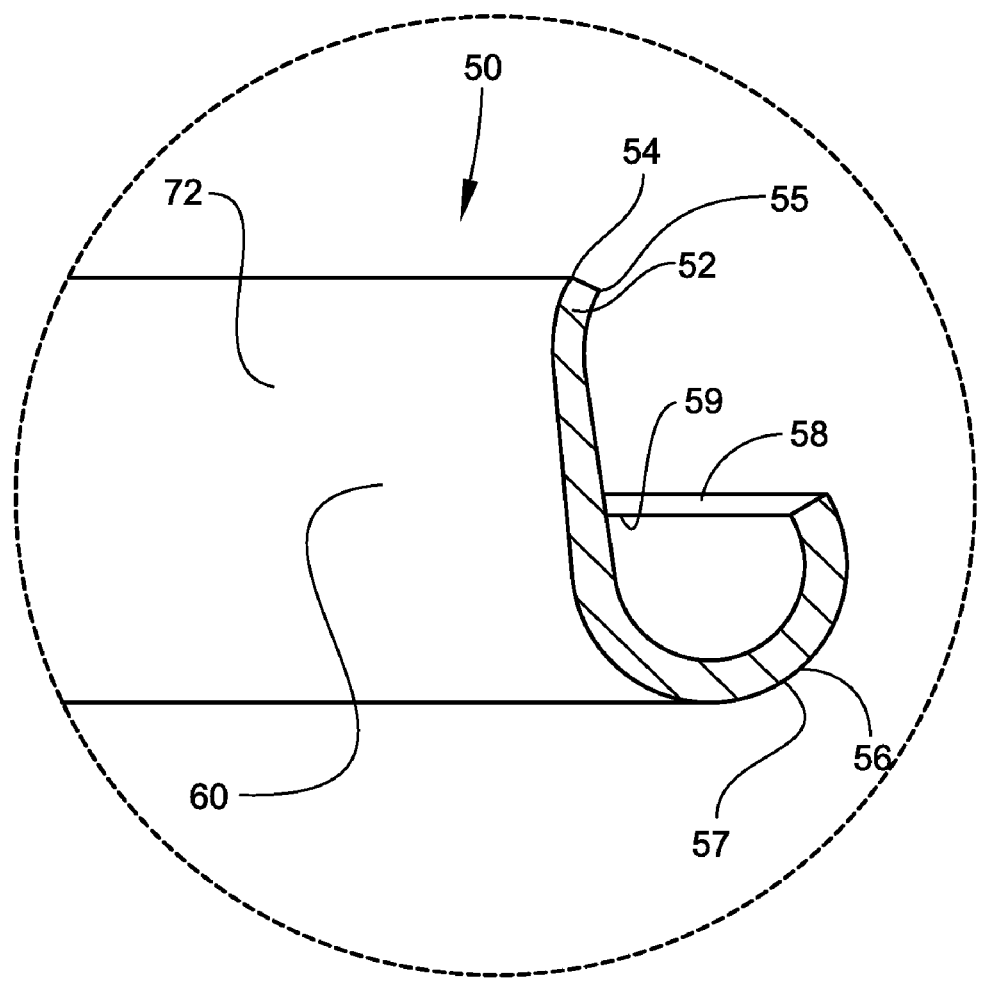
FIG. 2C is an enlarged view of a portion of the view shown in FIG. 2B.
Figure 2D:
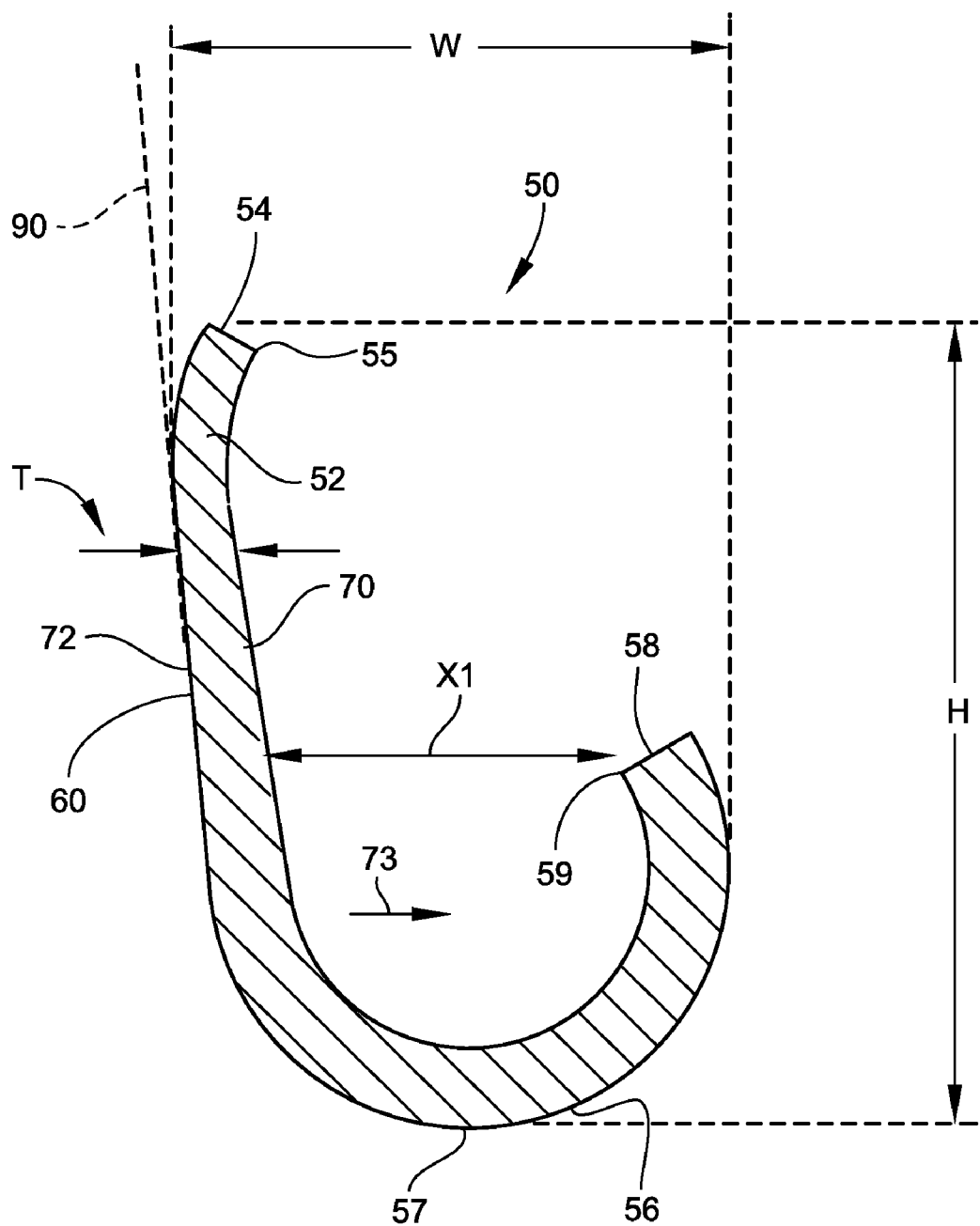
FIG. 2D is a further enlarged cross-sectional view taken along line 2D-2D in FIG. 2A.

Referring to FIGS. 2A, 2B, 2C and 2D, there are shown various views of seal 50 in accordance with one embodiment of the present invention. Seal 50 has a substantially annular shape and has a predetermined degree of resiliency. Seal 50 has a generally "j" shaped or hook-shaped cross-section. Seal 50 comprises first end portion 52. First end portion 52 has a distal end 54. This distal end defines edge 55. Seal 50 further comprises a generally curled second end portion 56 that includes an arcuate or curved portion 57. Second end portion 56 extends to distal end 58. Distal end 58 defines edge 59. Seal 50 further comprises central body portion 60 that is between and contiguous with first end portion 52 and second end portion 56. In a preferred embodiment, central body portion 60 has a generally frustro-conical shape. In a preferred embodiment, central body portion 60 is configured so that it does not have any inflection points formed therein. Seal 50 has first side 70 and opposite second side 72. Second end portion 56 curls in a first direction 73 in accordance with a predetermined radius of arcuate portion 57 such that distal end 58 is located across from first side 70 by a predetermined distance X1 and distal ends 54 and 58 do not face each other. These aforesaid features are also shown in FIG. 2C which is an enlarged view of a portion of the view of FIG. 2B. As shown in FIGS. 2A and 2D, seal 50 has outer diameter D1, inner diameter D2, radial width W and height H. In this particular embodiment, end portion 52 defines inner diameter D2.

Referring to FIG. 2D, in one embodiment, first end portion 52 is slightly angulated in first direction 73 with respect to dashed reference line 90. In one embodiment of the invention, the annular seal 50 has a thickness T that tapers in the direction of distal end portion 52. In a preferred embodiment, the rate of taper is substantially uniform. It has been found that such a taper in thickness increases or enhances the flexibility of seal 50. Preferably, as a result of the taper, the thickness of seal 50 at first end portion 52 is about 70% of the thickness of seal 50 at second end portion 56.

Preferably, end portion 52 has a degree of stiffness that ensures roundness and stability and which also facilitates engagement with an inner cylindrical surface upon installation. Examples of such an inner cylindrical surface would be a piston, rod or shaft. The relatively small size and stiffness of end portion 52 avoids an increase in the installation and sliding forces. Furthermore, the relatively small size of end portion 52 reduces the second moment of area at the end of seal 50 and thus, reduces the seal's resistance to deflection at that end. Preferably, end portion 56 has a relatively high degree of stiffness so that when seal 50 is installed, end portion 56 clings tightly to the outer cylindrical surface of the sealing cavity thereby resisting axial forces from the slidable end of seal 50. The result is a leak-tight seal. An example of such an outer cylindrical cavity surface would be the inner surface of a bore, tube or hole.

The size of seal 50 can be varied in order to be used in various applications. For example, in one embodiment, outer diameter D1 is about 78.18 mm, inner diameter D2 is about 70.76 mm, radial width W is about 3.7 mm and height H is about 5.84 mm. It is to be understood that seal 50 can be configured to have other dimensions. The actual dimensions depend upon the particular application in which the seal will be used.

Figure 3C:
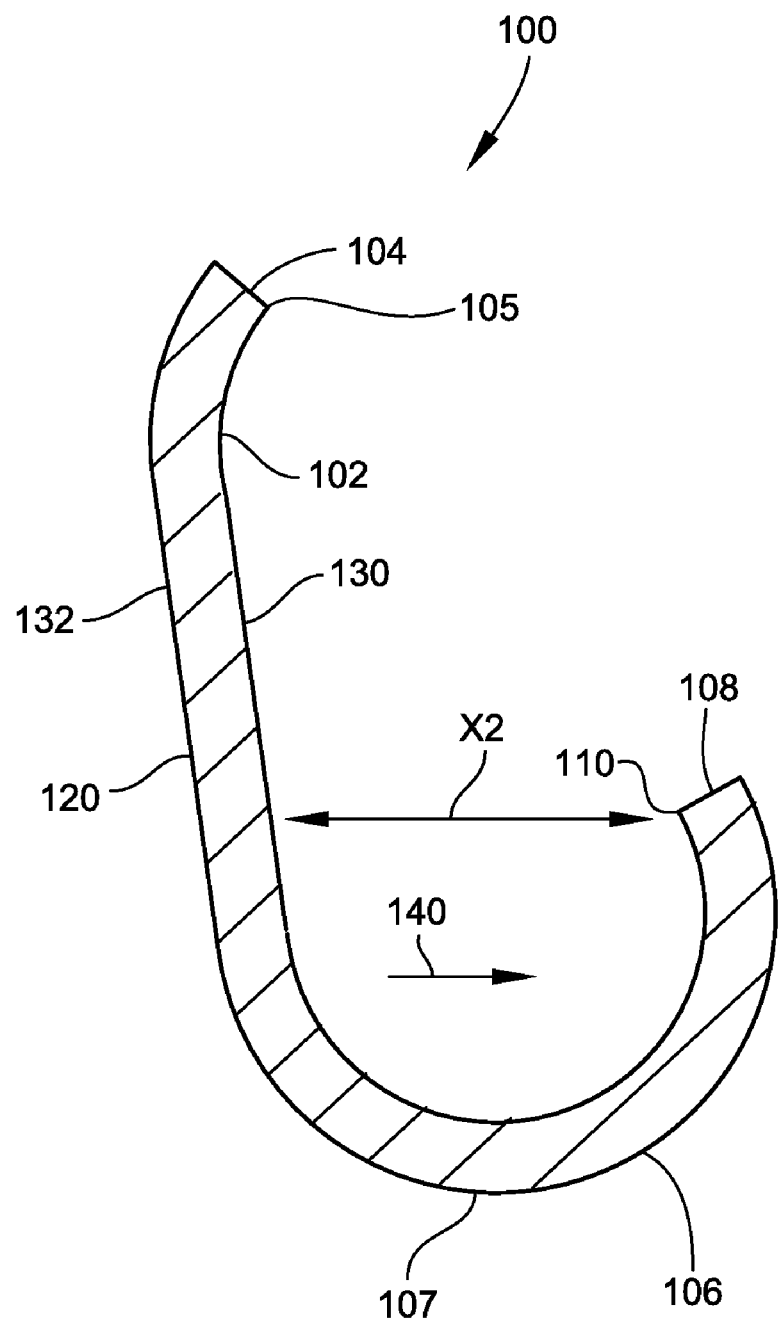
FIG. 3C is a cross-sectional view taken along line 3C-3C of FIG. 3A.
Figure 4:
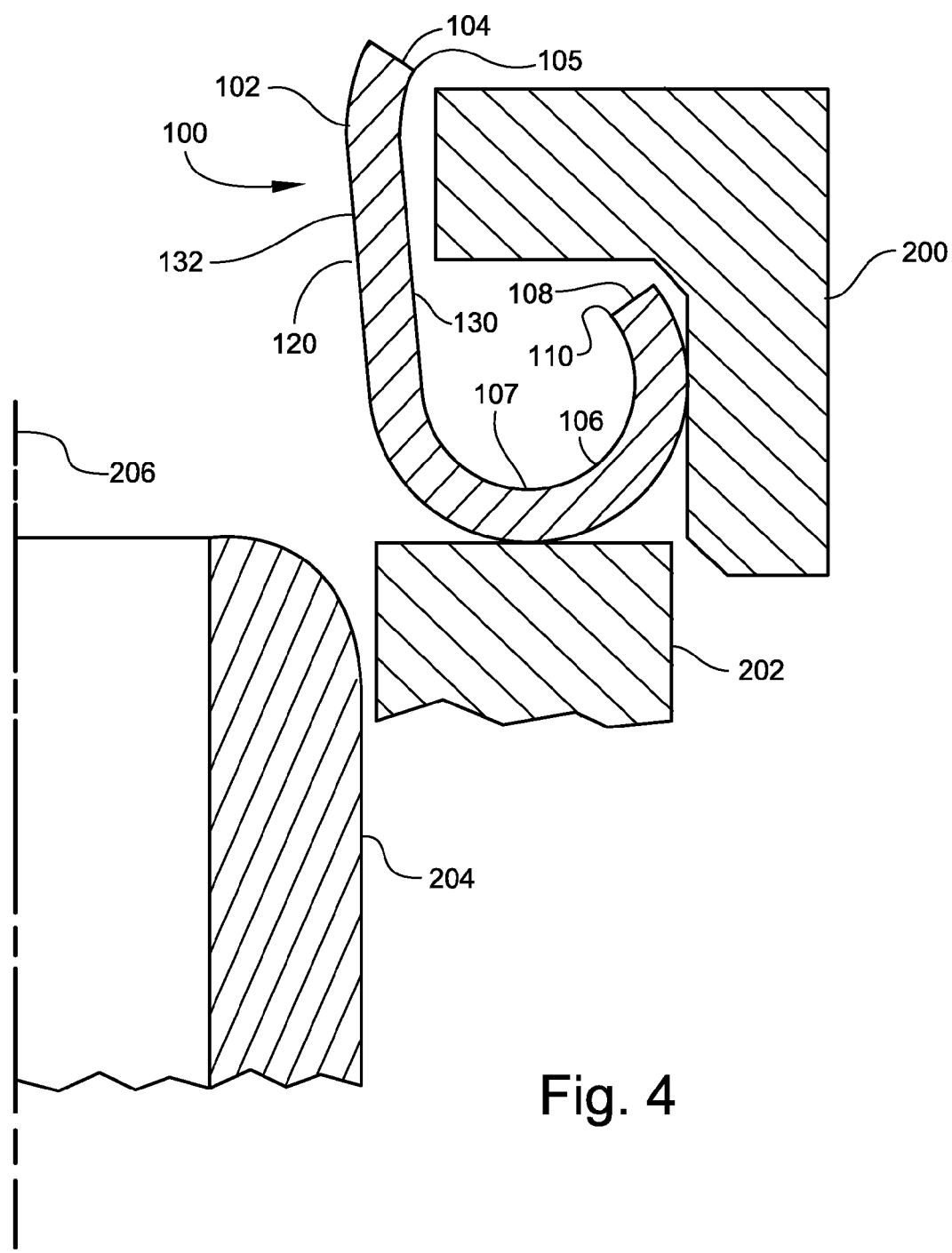
FIG. 4 is a cross-sectional view illustrating the installation of the seal of FIG. 3A in a body of a coupling.
Figure 5:
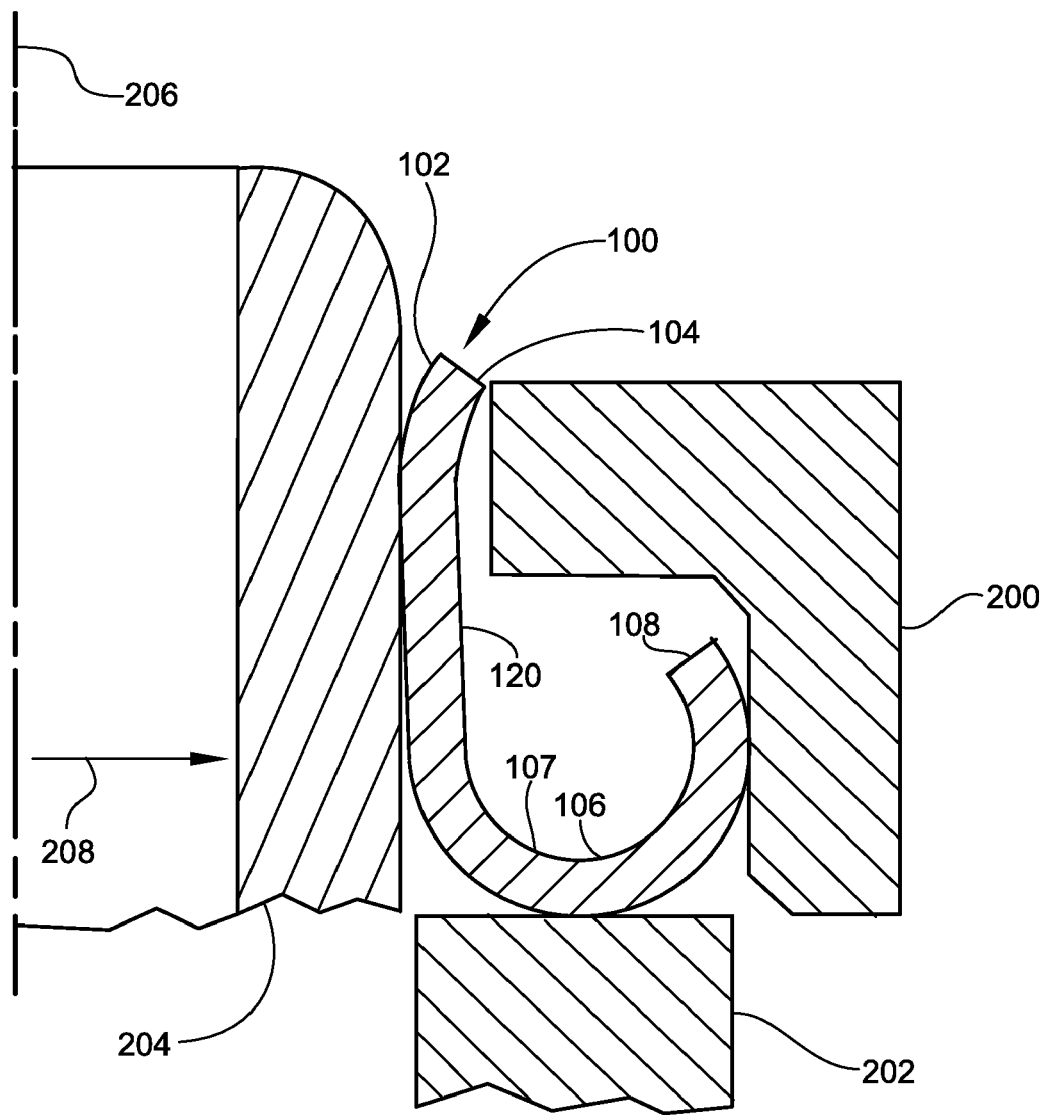
FIG. 5 is a cross-sectional view, based on FIG. 4, showing the seal of FIG. 3A installed in the body of the coupling with an axis of the probe displaced to the right.
Figure 6:
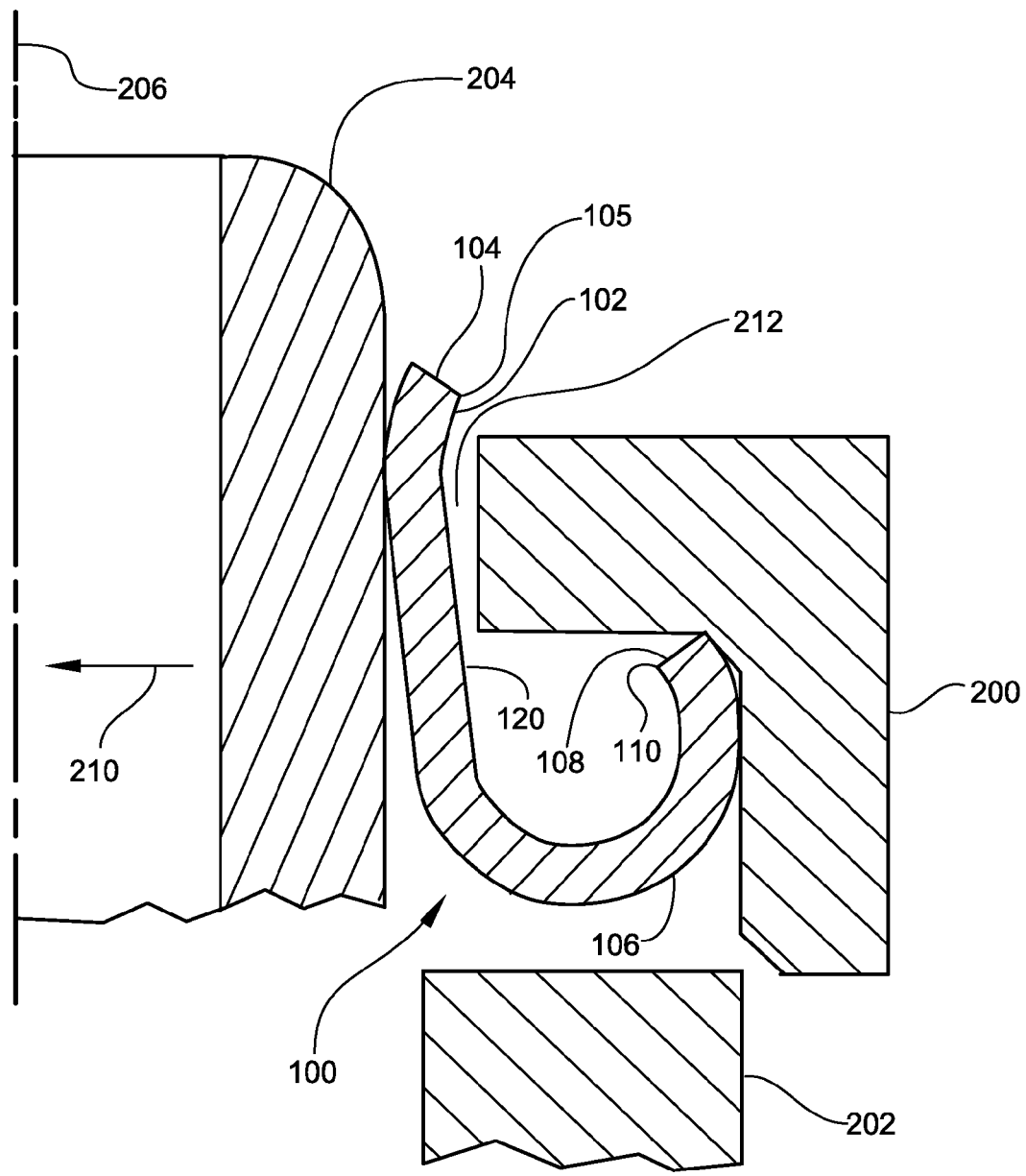
FIG. 6 is a cross-sectional view, similar to the view of FIG. 5, showing the axis of the probe displaced to the left.

Referring to FIGS. 3A, 3B and 3C, there is shown seal 100 in accordance with an alternate embodiment of the invention. In this embodiment, the thickness of seal 100 does not taper. Seal 100 has a generally "j" shaped or hook-shaped cross-section and comprises first end portion 102. First end portion 102 has a distal end 104. Distal end 104 defines edge 105. Seal 100 further comprises a generally curled second end portion 106 that has curved or arcuate portion 107. Curled second end portion 106 extends to distal end 108. Distal end 108 defines edge 110. Seal 100 further comprises central body portion 120 that is between and contiguous with first end portion 102 and second end portion 106. Preferably, central body portion 120 has a generally frustro-conical shape. Seal 100 has first side 130 and opposite second side 132. As shown in FIG. 3C, second end portion 106 curls in a first direction 140 in accordance with a predetermined radius of arcuate portion 107 such that distal end 108 is located across from first side 130 by a predetermined distance X2 and distal ends 104 and 108 do not face each other. In accordance with this embodiment of the invention, the thickness of seal 100 does not have a taper and the thickness of seal 100 is uniform throughout. Referring to FIG. 4, there is illustrated the installation of a seal of the present invention in the body of a coupling. For purposes of example, seal 100 is shown inserted into body 200 of a coupling. Axial retaining wall 202 is positioned adjacent seal 100 and probe 204 is spaced apart from seal 100. The center-line of probe 204 is indicated by reference number 206. Referring to FIG. 5, seal 100 is installed in an interference relationship with body 200 and abuts axial retaining wall 202 while probe 204 is inserted in contacting, interfering relationship with seal 100. Probe 204 contacts frustro-conical portion 120 of seal 100. End portion 102 and frustro-conical central body portion 120 elastically deflect so as to allow lateral offset of probe 204 in the direction indicated by arrow 208 without causing leakage. Thus, center-line 206 of probe 204 is displaced to the right with respect to body 200. Sealing contact is maintained by virtue of hoop stress, keeping all points around the inner circumference of the seal in tight contact with the probe. Referring to FIG. 6, center-line 206 of probe 204 is now displaced to the left with respect to body 200, in the direction indicated by arrow 210, thereby widening the space or gap 212 between central body portion 120 of seal 100 and body 200.

Figure 7:
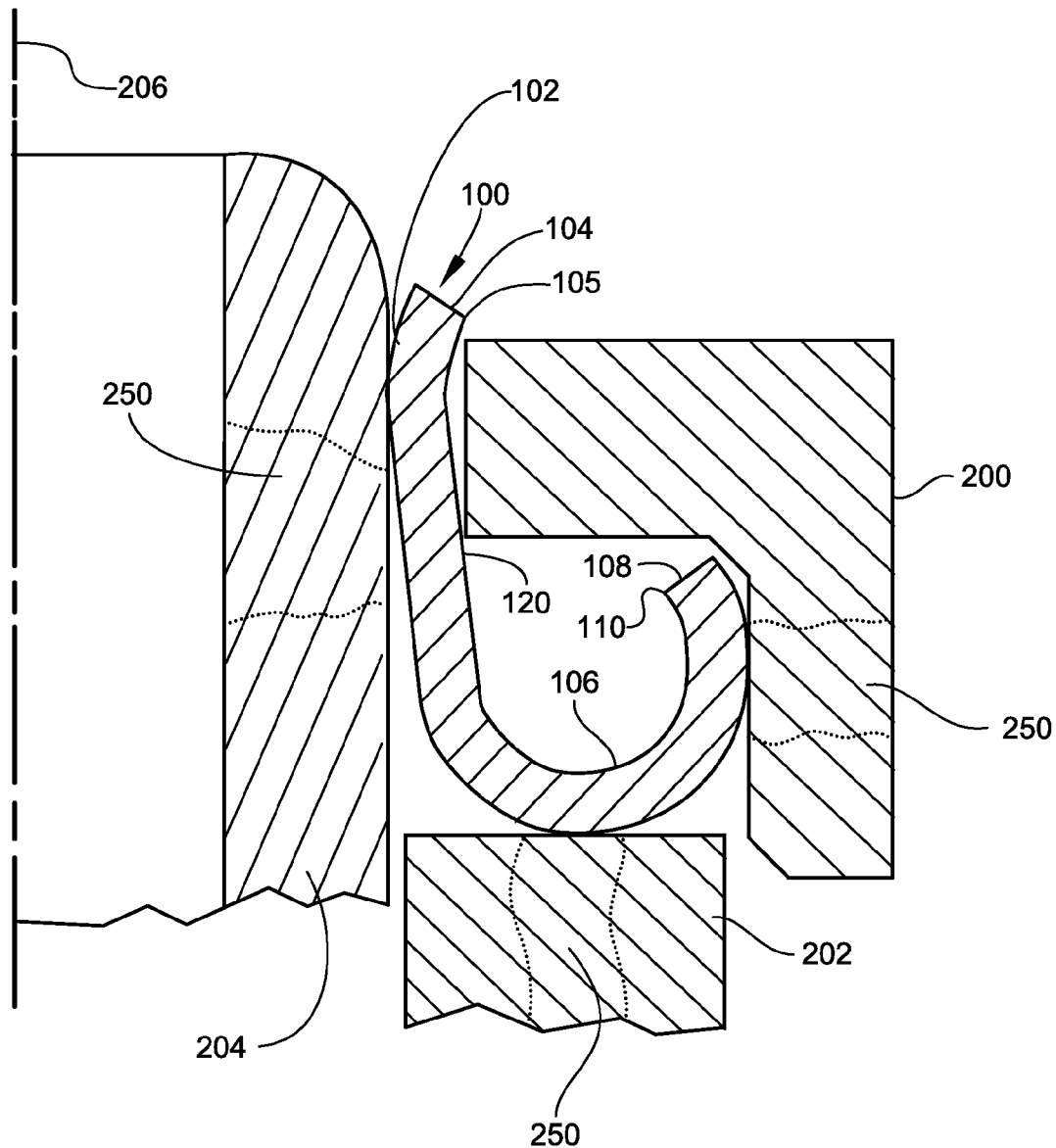
FIG. 7 is a cross-sectional view of the seal installed in the body of the coupling at operating pressure.

Referring to FIG. 7, there is shown a view similar to the views shown in FIGS. 5 and 6 showing seal 100 installed in body 200 of a coupling. When seal 100 is operated at relatively high pressures, such as 30,000 psi, relatively high-stress contact regions are formed on probe 204, retaining wall 202 and body 200. These high-stress contact regions are indicated by reference numbers 250. High contact stresses are needed to prevent leakage of high pressure fluids.

As described in the foregoing description, seal 100 does not have a tapered thickness as does seal 50. If seal 50 was installed in the body of the coupling as shown in FIGS. 4-7 instead of seal 100, the tapered thickness would allow an increase in the lateral offset of probe 204.

Figure 8C:
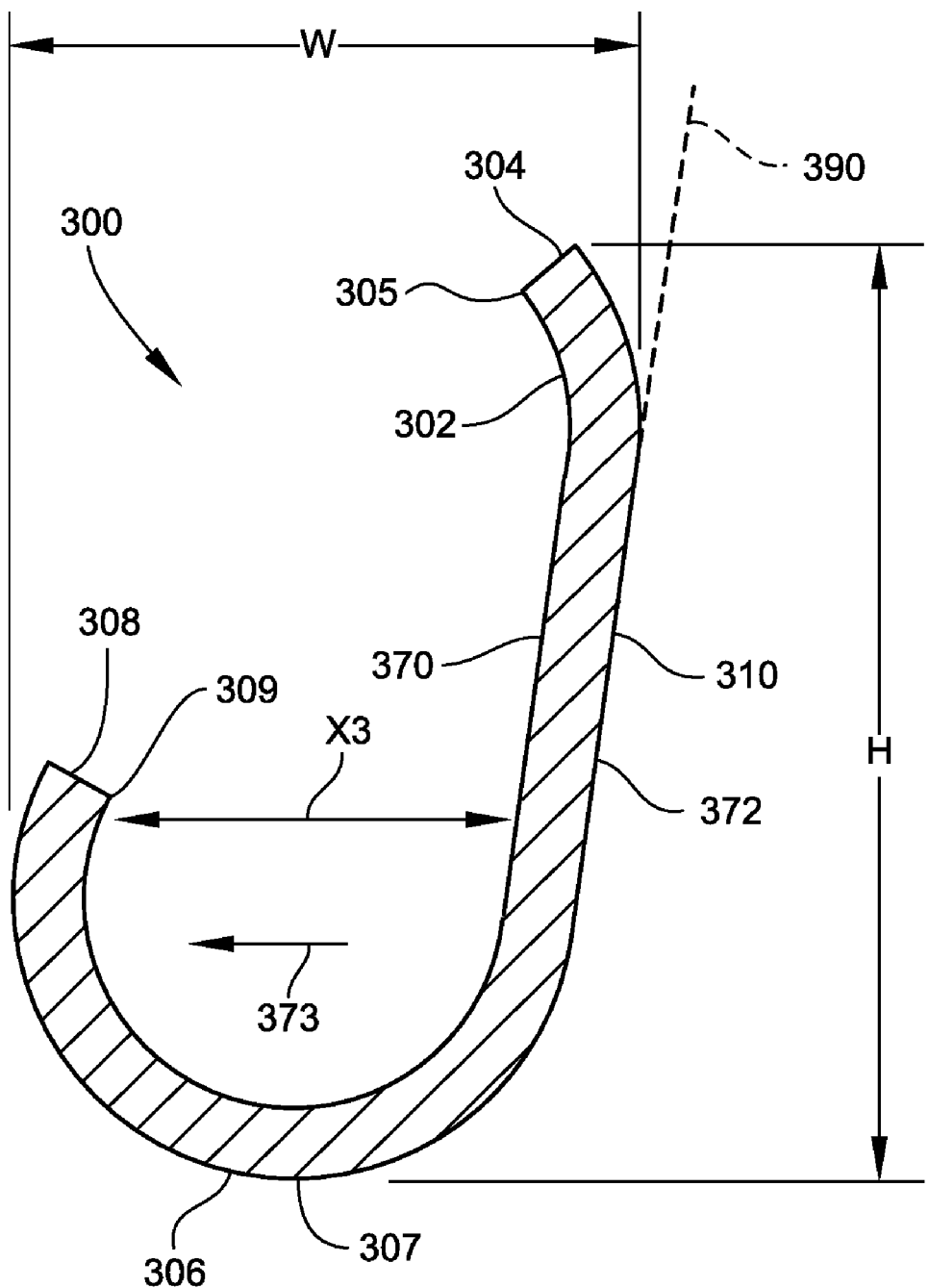
FIG. 8C is a cross-sectional view taken along line 8C-8C of FIG. 8A.

Referring to FIGS. 8A, 8B and 8C, there is shown seal 300 in accordance with another embodiment of the invention. Seal 300 has a substantially annular shape and a predetermined degree of resiliency. Seal 300 has a generally "j" shaped or hook-shaped cross-section. Seal 300 comprises first end portion 302. First end portion 302 has a distal end 304. Distal end 304 defines edge 305. Seal 300 further comprises a generally curled second end portion 306. Second end portion 306 includes arcuate or curved portion 307. Second end portion 306 extends to distal end 308. Distal end 308 defines edge 309 (see FIG. 8C) Seal 300 further comprises central body portion 310 that is between and contiguous with first end portion 302 and second end portion 306. In a preferred embodiment, central body portion 310 has a generally frustro-conical shape. In a preferred embodiment, central body portion 310 is configured so that it has neither a taper in material thickness nor any inflection points formed therein. Seal 300 has first side 370 and opposite second side 372. Second end portion 306 curls in a direction indicated by arrow 373 in accordance with a predetermined radius of arcuate portion 307 such that distal end 308 is located across from first side 370 by a predetermined distance X3 and distal ends 304 and 308 do not face each other. Seal 300 has outer diameter D1, inner diameter D2, radial width W and height H. In accordance with this embodiment of the invention, first end portion 302 defines outer diameter D1.

Referring to FIG. 8C, in one embodiment, first end portion 302 is slightly angulated in first direction 373 with respect to dashed reference line 390. In this embodiment, the material thickness of seal 300 is substantially uniform and there is no taper in the material thickness.

Test Results

The seal of the present invention conforming to FIGS. 8A-8C was tested in order to evaluate operating characteristics. The seal tested had an outside diameter D1 of about 80 mm, a radial width W of about 3.7 mm and a material thickness T of about 0.25 mm. The seal was inserted between two coaxial cylindrical components. The test apparatus was first pressurized with air at 700 Kpa (kilopascals). The measured initial leakage was 0.0023 l/s (liters/second) without any offset applied to the cylindrical components. Next, a lateral offset was applied to the cylindrical components. The lateral offset was introduced in stages and was increased to about 0.30 mm without any increase in leakage. When the lateral offset was increased to 0.35 mm, the leakage increased to approximately 0.017 l/s (liters/second).

In contrast to the performance of the seal of the present invention, as shown by the foregoing test, a typical prior art axial C-seal having an outside diameter of about 80 mm reaches its limit for sealing efficacy when an offset between about 0.025 to 0.050 mm is applied to the coaxial cylindrical components.

In another test, a small seal of the configuration shown in FIGS. 3A-3D was tested in order to evaluate sealing efficacy with respect to oil. The seal had an outside diameter D1 of about 19.13 mm, a radial width W of about 1.68 mm and a material thickness T of about 0.25 mm. The seal was able to seal oil at 40,000 psi and was reusable following multiple "stabbing" connections. This small diameter seal demonstrated sealing efficacy up to a 0.05 mm offset applied to the cylindrical components.

Figure 9C:
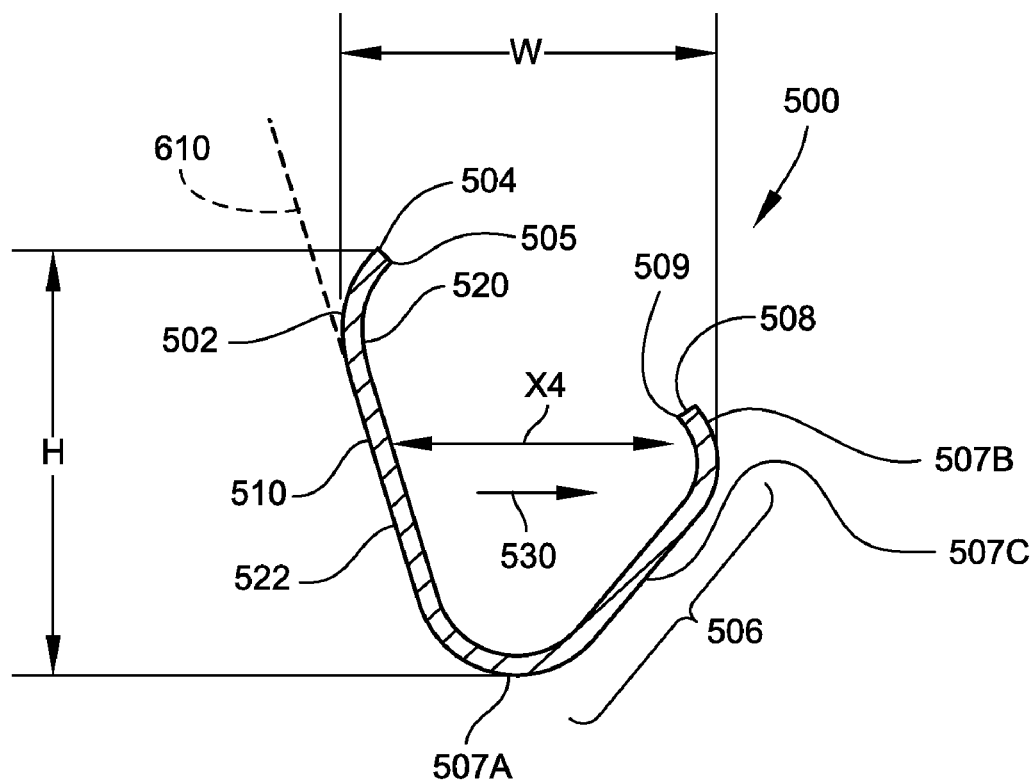
FIG. 9C is a cross-sectional view taken along line 9C-9C of FIG. 9A.

Referring to FIGS. 9A, 9B and 9C, there is shown seal 500 in accordance with another embodiment of the present invention. Seal 500 has a substantially annular shape and a predetermined degree of resiliency. Seal 500 has an outer diameter D1, an inner diameter D2, a radial width W and a height H (see FIG. 9C). The radial width W spans the tangency points. Seal 500 has a generally hook-shaped cross-section. Seal 500 comprises first end portion 502. First end portion 502 has a distal end 504. Distal end 504 defines edge 505. Seal 500 further comprises a generally curled second end portion 506. Second end portion 506 includes arcuate or curved portion 507A. Second end portion 506 includes portion 507B which extends to distal end 508. Second end portion 506 also includes a linear portion 507C that is between and contiguous with portions 507A and 507B. The purpose of linear portion 507C is discussed in the ensuing description. Distal end 508 defines edge 509. Seal 500 further comprises central body portion 510 that is between and contiguous with first end portion 502 and second end portion 506. In a preferred embodiment, central body portion 510 has a generally frustro-conical shape. Central body portion 510 is configured so that it does not have any inflection points formed therein. Seal 500 has first side 520 and opposite second side 522. In accordance with this embodiment of the invention, second end portion 506 curls in a direction indicated by arrow 530 in accordance with a predetermined radius of arcuate or curved portion 507A such that distal end 508 is located across from first side 520 by a predetermined distance X4. As a result of this configuration, distal ends 504 and 508 do not face each other. In this embodiment, end portion 502 defines inside diameter D2.

Referring to FIG. 9C, in one embodiment, first end portion 502 is slightly angulated in first direction 530 with respect to dashed reference line 610. Portion 507B of second end portion 506 slightly curls inward. However, distal ends 504 and 508 do not directly face each other. In one embodiment, seal 500 has a uniform thickness. In an alternate embodiment, seal 500 has a thickness that tapers in the direction of end portion 502. The length of generally linear portion 507C and the radius of arcuate portion 507A determine the distance X4 which separates distal end 508 from side 520 of central body portion 510. Thus, increasing the radius of arcuate portion 507A and the length of generally linear portion 507C will increase distance X4. Likewise, decreasing the radius of arcuate portion 507A and the length of linear portion 507C decreases the distance X4. Such a configuration allows seal 500 to be retrofitted to existing cavities that were originally designed for a different type of seal. Seal 500 has generally the same operating characteristics as the other embodiments of the seal of the present invention described in the foregoing description.

Referring to FIGS. 10A and 10B, there is shown seal 600 in accordance with another embodiment of the present invention. Seal 600, like seal 500, is configured to be retrofitted to existing cavities that were originally designed for a different type of seal. As will be apparent from the ensuing description, the configuration of seal 600 is opposite to the configuration of seal 500. Seal 600 has a substantially annular shape and a predetermined degree of resiliency. Seal 600 has a generally hook-shaped cross-section. Seal 600 comprises first end portion 602. First end portion 602 has a distal end 604. This distal end 604 defines edge 605. Seal 600 further comprises a generally curled second end portion 606. Second end portion 606 includes arcuate or curved portion 607A. Second end portion 606 includes portion 607B which extends to distal end 608. Distal end portion 608 has edge 609. Second end portion 606 also includes a linear portion 607C that is between and contiguous with portions 607A and 607B. The purpose of linear portion 607C is the same as linear portion 507C of seal 500 discussed in the foregoing description. Seal 600 further comprises central body portion 610 that is between and contiguous with first end portion 602 and second end portion 606. In a preferred embodiment, central body portion 610 has a generally frustro-conical shape. Seal 600 has first side 640 and an opposite second side (not shown). In accordance with this embodiment of the invention, second end portion 606 curls in a direction in accordance with a predetermined radius of arcuate or curved portion 607A such that distal end 608 is located across from first side 640 by a predetermined distance. Portion 607B of end portion 606 is slightly angulated inward as is portion 507B of seal 500. Distal ends 604 and 608 do not directly face each other. In accordance with this embodiment, end portion 602 defines the outer diameter D1 of seal 600. In one embodiment, the material thickness of the seal 600 is substantially uniform. In an alternate embodiment, seal 600 has a thickness that tapers in the direction of end portion 602.

Referring to FIG. 10B, the length of generally linear portion 607C and the radius of arcuate portion 607A determine the distance which separates distal end 608 from side 640. Thus, increasing the radius of arcuate portion 607A and the length of generally linear portion 607C will increase the distance between side 640 and distal end 608. Decreasing the radius of arcuate portion 607A and the length of linear portion 607C decreases the distance between side 640 and distal end 608.

Figures 11A, 11B:
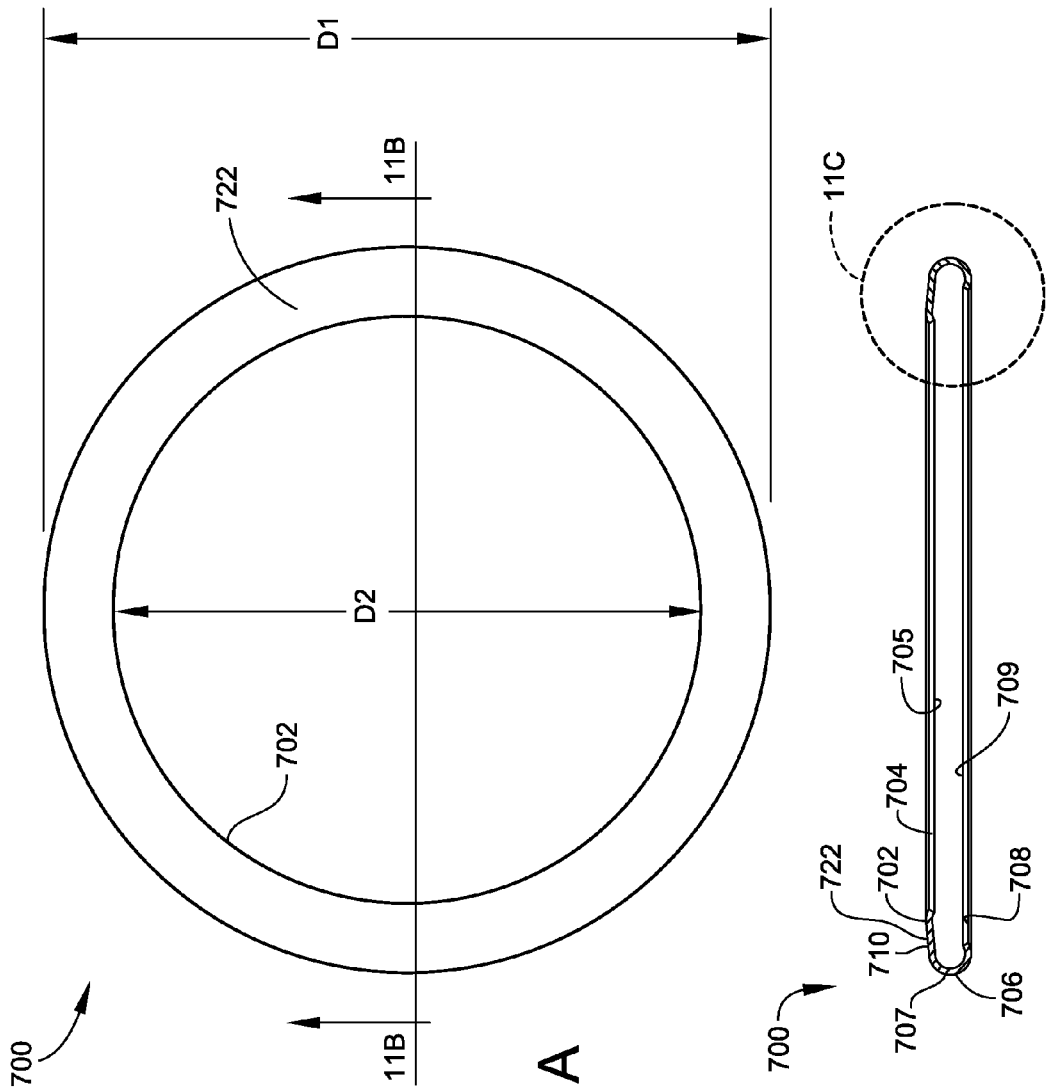
FIG. 11A is a plan view of a seal in accordance with another embodiment of the present invention.
FIG. 11B is a cross-sectional view, in longitudinal section, taken along line 11B-11B of FIG. 11A.
Figure 11C:
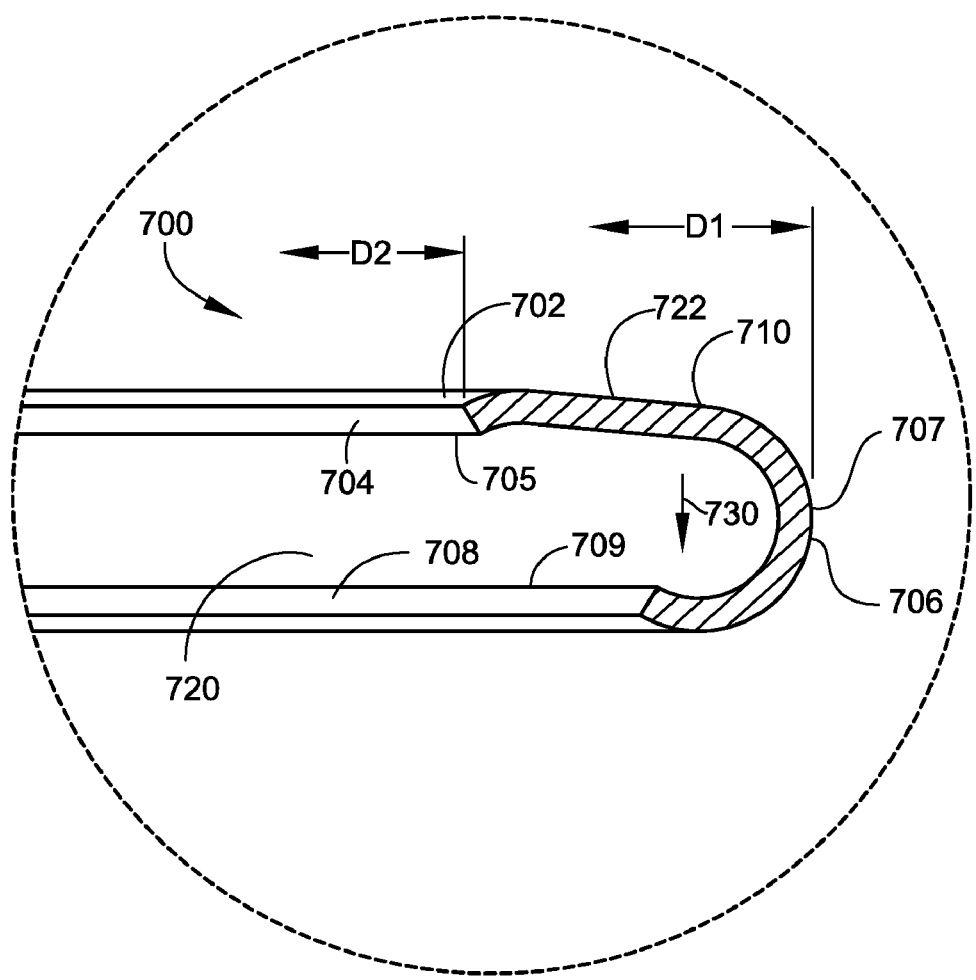
FIG. 11C is an enlarged view of a portion of the view shown in FIG. 11B.

Referring to FIGS. 11A, 11B and 11C, there are shown various views of an internal pressure face seal 700 in accordance with a further embodiment of the invention. FIG. 11C is an enlarged view of a portion of the view of FIG. 11B. A comparison of external pressure face seal 700 (as shown in FIG. 11C) to seal 300 of FIG. 8C shows that the configuration of seal 700 is based upon a rotation of seal 300 in a counter-clockwise orientation. The degree of rotation is about 90 degrees. Seal 700 has a substantially annular shape and has predetermined degree of resiliency. Seal 700 has a generally "j" shaped or hook-shaped cross-section. Seal 700 comprises first end portion 702. First end portion 702 has a distal end 704. Distal end defines edge 705 (see FIG. 11C). Seal 700 further comprises a generally curled second end portion 706 that includes an arcuate or curved portion 707. Second end portion 706 extends to distal end 708. Distal end 708 defines edge 709. Seal 700 further comprises central body portion 710 that is between and contiguous with first end portion 702 and second end portion 706. In a preferred embodiment, central body portion 710 is configured so that it does not have any inflection points formed therein. Seal 700 has first side 720 and opposite second side 722 (see FIG. 11A). Second end portion 706 curls in a first direction 730 in accordance with a predetermined radius of arcuate portion 707 such that distal end 708 is located across from first side 720 by a predetermined distance and distal ends 704 and 708 do not face each other. As shown in FIG. 11A, seal 700 has outer diameter D1 and inner diameter D2. In this particular embodiment, end portion 702 defines inner diameter D2. In accordance with this embodiment of the invention, seal 700 is configured so that when the seal 700 is positioned as shown in FIG. 11A, central body portion 710 is not upstanding or vertical, but rather, is in a somewhat generally horizontal position as shown in FIG. 11C.

Referring to FIG. 11C, in one embodiment, first end portion 702 is slightly angulated in first direction 730. In one embodiment, seal 700 has a thickness that is uniform. In an alternate embodiment, seal 700 is configured to have a thickness that tapers in the direction of distal end portion 702.

Figure 11D:
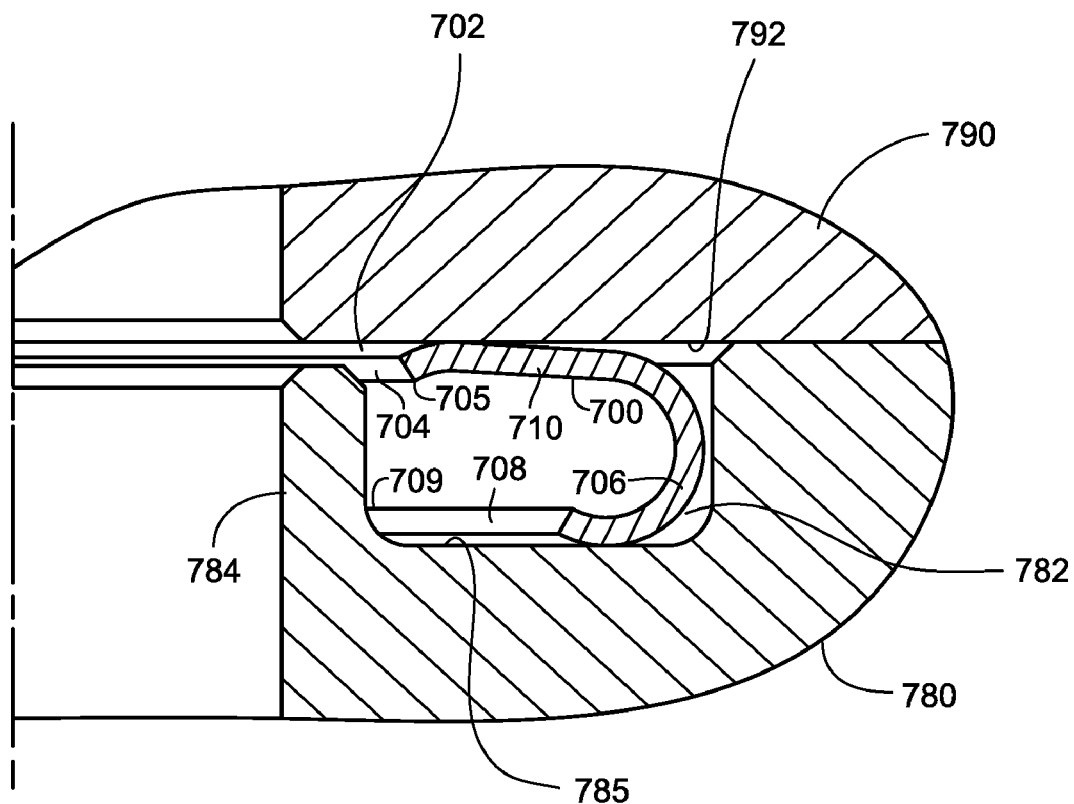
FIG. 11D is a cross-sectional view of the seal of FIG. 11A installed in a cavity between two components.

Referring to FIG. 11D, there is shown internal pressure face seal 700 installed between two components. Component 780 has groove 782 within which seal 700 is positioned. Component 780 includes wall portion 784 and inner surface 785. Inner surface 785 tangentially contacts end portion 706 of seal 700. Wall portion 784 is a flow-improvement feature which may or may not be present. Component 790 is above component 780 and has inner surface 792. Inner surface 792 contacts seal 700 tangentially at end portion 702. The advantages of seal 700 are discussed in the ensuing description.

Figures 12A, 12B:
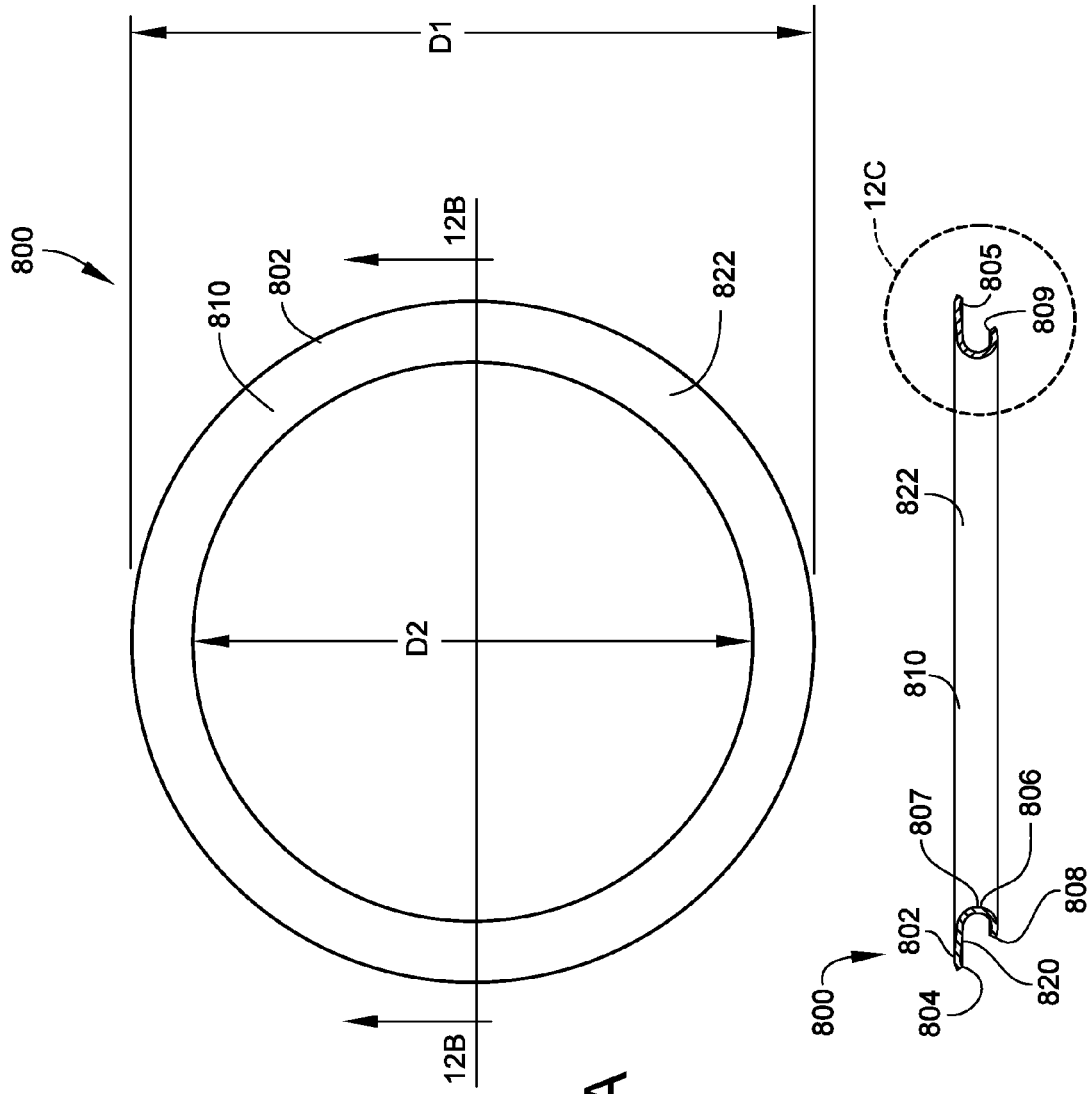
FIG. 12A is a plan view of a seal in accordance with a further embodiment of the present invention.
FIG. 12B is a cross-sectional view, in longitudinal section, taken along line 12B-12B of FIG. 12A.
Figure 12C:
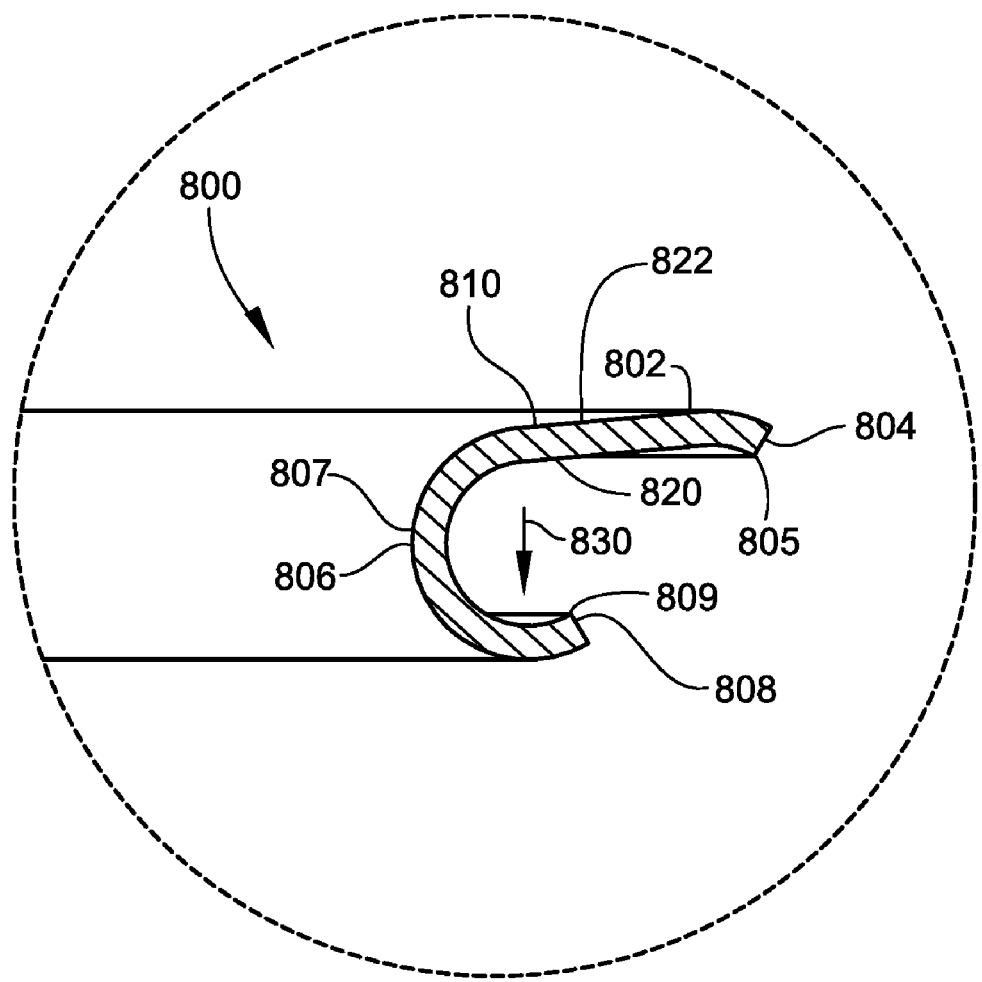
FIG. 12C is an enlarged view of a portion of the view shown in FIG. 12B.

Referring to FIGS. 12A, 12B and 12C, there are shown various views of an external pressure face seal 800 in accordance with a further embodiment of the invention. FIG. 12C is an enlarged view of a portion of the view of FIG. 12B. A comparison of external pressure face seal 800 (as shown in FIG. 12C) to seal 300 of FIG. 8C shows that the configuration of seal 800 is based on rotation of seal section 300 in a clock-wise direction. Preferably, the degree of rotation is about 90 degrees. Seal 800 has a substantially annular shape and has predetermined degree of resiliency. Seal 800 has a generally "j" shaped or hook-shaped cross-section. Seal 800 comprises first end portion 802. First end portion 802 has a distal end 804. This distal end 804 defines edge 805. Seal 800 further comprises a generally curled second end portion 806 that includes an arcuate or curved portion 807. Second end portion 806 extends to distal end 808. Distal end 808 defines edge 809. Seal 800 further comprises central body portion 810 that is between and contiguous with first end portion 802 and second end portion 806. In a preferred embodiment, central body portion 810 is configured so that it does not have any inflection points formed therein. Seal 800 has first side 820 and opposite second side 822. Second end portion 806 curls in a first direction 830 in accordance with a predetermined radius of arcuate portion 807 such that distal end 808 is located across from first side 820 by a predetermined distance and distal ends 804 and 808 do not face each other. As shown in FIG. 12A, seal 800 has outer diameter D1 and inner diameter D2. In this particular embodiment, end portion 802 defines outer diameter D1. In accordance with this embodiment of the invention, seal 800 is configured so that when the seal 800 is positioned as shown in FIG. 12A, central body portion 810 is not upstanding or vertical, but rather, is in a somewhat general horizontal position.

Referring to FIG. 12C, in one embodiment, first end portion 802 is slightly angulated in first direction 830. In one embodiment, seal 800 has a thickness that is uniform. In an alternate embodiment, seal 800 is configured to have a thickness that tapers in the direction of distal end portion 802.

Figure 12D:
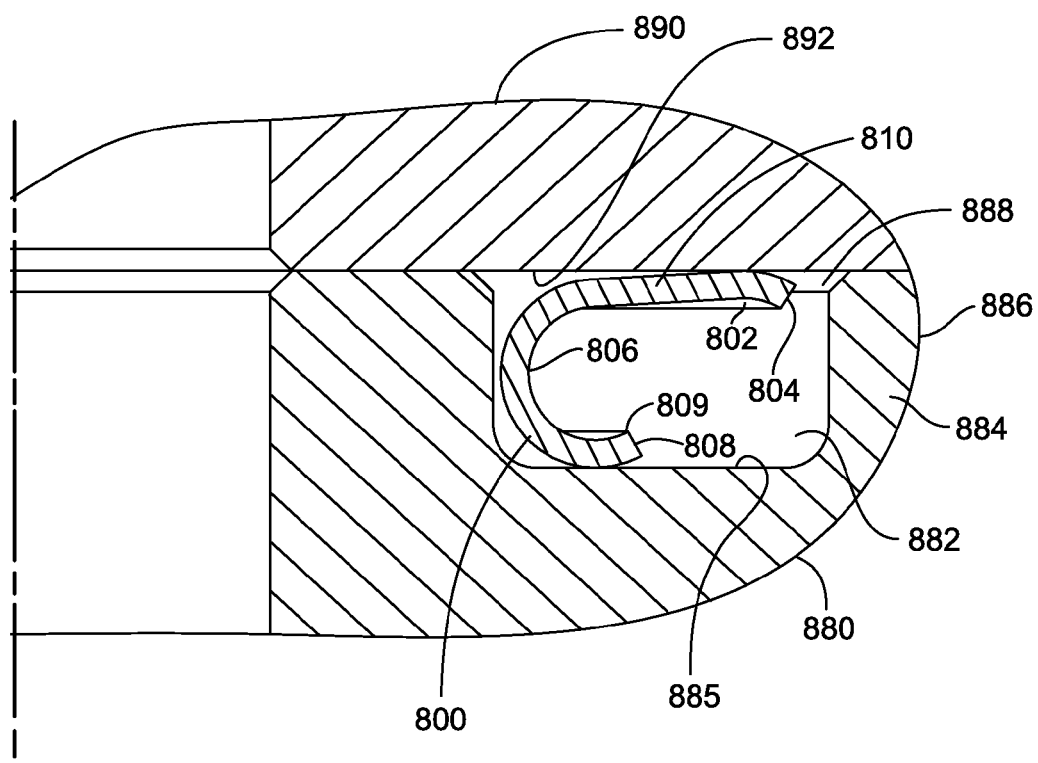
FIG. 12D is a partial, cross-sectional view, illustrating the installation of the seal of FIG. 12A.

Referring to FIG. 12D, there is shown external pressure face seal 800 installed between two components that are in a confronting relationship. Component 880 has cavity or channel 882 within which external pressure face seal 800 is positioned. Component 880 includes wall portion 884 and inner surface 885. Inner surface 885 tangentially contacts a portion of end 806 of seal 800. Component 890 is above component 880 and has inner surface 892 that tangentially contacts seal 800 at end portion 802.

Due to the configuration of seals 700 and 800, these seals do not undergo extensive plastic deformation. An important feature and advantage of seal 700 and seal 800 is that these seals are capable of elastic recovery of over 8% of their uncompressed height, even after operating at high pressures and temperatures. A characteristic of seals 700 and 800 is that when either of these seals has a relatively small diameter, they deflect relatively more in flexure of their cross-sections than in torsion. In contrast, seals having a relatively large diameter-to-cross-section ratio accommodate more of the input deflection in torsion.

The seals of the present invention may be installed between surfaces that form various geometrical shapes. For example, in FIGS. 13A and 13B, there is shown seal 900 that is installed between components 901 and 902. Components 901 and 902 have generally conical surfaces. FIG. 13A shows seal 900 just prior to complete installation and FIG. 13B shows seal 900 after it is completely installed. The structure of seal 900 is basically the structure of seal 300 with the cross-section of seal 300 rotated forty-five (45) degrees. Referring to FIG.

13A, component 901 has extending conical surface 904 and component 902 has extending conical surface 906. A portion of seal 900, indicated by reference number 994, abuts surface 904. Another portion of seal 900, indicated by reference number 996, abuts surface 906.

The seal of the present invention may be fabricated from a variety of materials. In a preferred embodiment, the seal of the present invention is fabricated from a ductile, corrosion resistant, high strength metal. In certain cases, the metal must be suitable for continuous use at 1300 degrees F. Suitable metals for fabricating the seal of the present invention include nickel based alloys, nickel super alloys, nickel-cobalt alloys, copper based alloys, aluminum-based alloys and stainless steel. Other suitable metals and alloys include a precipitation hardened, high-temperature alloy such as Waspaloy or Inconel. One such suitable nickel alloy is Nickel Alloy 718 which has been found to have excellent properties at both low and elevated temperatures.

Coatings may be applied to the sliding contact surfaces of the seal to enhance sealing efficiency and/or reduce wear.

In another embodiment, the seal of the present invention is fabricated from composite materials. In a further embodiment, the seal of the present invention is fabricated from a ceramic material.

As described in the foregoing description, the seal of the present invention, when used between two concentric cylindrical surfaces, is retained in position on one or more of the two cylindrical surfaces by interference fit between the cylindrical diameter and the relatively stiff annular portion of the seal. The other annular portion of the seal, either the external or internal annular portion, is designed to be more flexible and exerts a relatively light interference force against the co-operating cylindrical surface. This enables sliding motion to take place at the co-operating cylindrical surface, while ensuring fluid containment at that location. For example, when the seal of the present invention is used to eliminate excessive leakage from a sectional exhaust manifold assembly, existing slip joints are modified to provide an annular sealing cavity. The seal is mounted on the inner cylindrical surface and slidingly engages the outer cylindrical surface with the more resilient leg of the seal's "J" shaped cross-section or hook-shaped cross-section so as to accommodate axial and radial thermal expansion movements.

Since the seal is retained to one cylindrical surface, the seal does not "walk" along the cylindrical surfaces when vibrations are present as do many prior art seals that merely lightly engage both cylindrical surfaces. In contrast, the seal of the present invention is displaced a distance that is solely due to the design conditions involving mechanical movements, thermal excursions, etc.

Thus, the present invention provides a resilient seal for high-pressure systems and connectors. There are many applications in which the seal of the present invention may be used. One such application is to provide improved sealing in exhaust-gas containment and recirculation ducting systems for modern, ecologically superior, highly efficient diesel truck engines.

It is preferred that prior to the installation of the seal of the present invention between two generally coaxial cylindrical surfaces as described in the foregoing description, lubricating oils may be applied to the cylindrical surfaces of the sealing cavities to facilitate assembly. Tribological coatings may be applied to the seal of the present invention to reduce wear. Other coatings, such as silver or gold, may be beneficially applied to the seal or its contact surfaces in order to improve its sealing efficiency. For dynamic applications, soft, lubricious or anti-galling, low-friction coatings may be applied to the seal's contact surfaces.

Thus, the seal of the present invention has several significant advantages. Referring to FIGS. 2A-2C, one advantage is the flexibility of second end portion 56 which allows said second end portion to be deflected radially by a lower force. Another advantage is that central body portion 60 deflects easily and thus may be deflected to accommodate an off-center probe without plastic deformation of this region. The seal of the present invention may be fabricated from material that is relatively thicker than the material used to fabricate prior art axial C-seal without an appreciable increase in insertion force or galling tendencies. When the seal of the present invention is made with such relatively thicker material, the greater material thickness and a close proximity between the installed probe and the deflected central body portion of the seal allow the seal to withstand the application of higher operating pressures without significant permanent deformation.

The seal of the present invention exhibits a high degree of reliability in accommodating multiple insertions of a probe. The frustro-conical geometry of the seal's central body portion is advantageous for dynamic, sliding applications, albeit at slow speeds, because of reduction of contact stresses.

Figure 14:
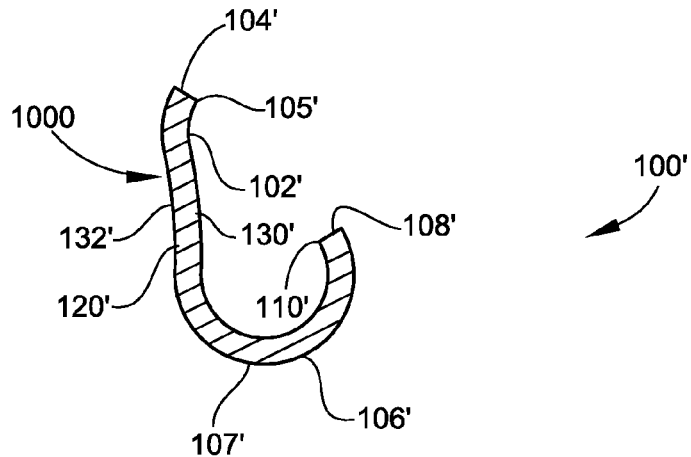
FIG. 14 is cross-sectional view, similar to FIG. 3C, of a seal in accordance with another embodiment of the present invention.

Although particular seal configurations and shapes have been described in the foregoing description, other configurations and shapes are possible. For example, the central body portion can be configured to have a generally conical shape or a slight curve. For example, referring to FIGS. 14, 15 and 16, there are shown alternate embodiments of the seals of the present invention wherein each seal is configured to have a curvature. FIG. 14 shows a cross-sectional view, similar to the view of FIG. 3C, of a seal in accordance with an alternate embodiment of present invention. Seal 100' is generally the same as seal 100 of FIG. 3A except that seal 100' has a curvature. Seal 100' has a generally "j" shaped or hook-shaped cross-section and comprises first end portion 102'. First end portion 102' has a distal end 104'. Distal end 104' defines edge 105'. Seal 100' further comprises a generally curled second end portion 106' that has curved or arcuate portion 107'. Curled second end portion 106' extends to distal end 108'. Distal end 108' defines edge 110'. Seal 100' further comprises central body portion 120' that is between and contiguous with first end portion 102' and second end portion 106'. Preferably, central body portion 120' has a generally frustro-conical shape. In accordance with this embodiment of the invention, central body portion 120' has a curvature or a "curving" geometry generally indicated by reference number 1000. Seal 100' has first side 130' and opposite second side 132'. Second end portion 106' curls in a first direction in accordance with a predetermined radius of arcuate portion 107' such that distal end 108' is located across from first side 130' and distal ends 104' and 108' do not face each other. In accordance with this embodiment of the invention, the material thickness of seal 100' is uniform throughout. In an alternate embodiment, the material thickness of seal 100' is tapered.

Figure 15:
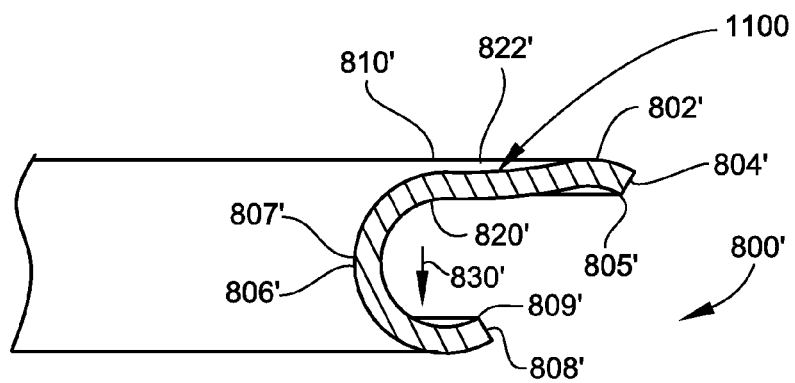
FIG. 15 is a cross-sectional view, similar to the view shown in FIG. 12C, of a seal in accordance with a further embodiment of the present invention.

Referring to FIG. 15, there is shown seal 800' which is an alternate embodiment of seal 800 of FIGS. 12A, 12B and 12C. Seal 800' has generally the same construction as seal 800 except that seal 800' has a curvature. The view shown in FIG. 15 is similar to the cross-sectional view shown in FIG. 12C. Seal 800' has a generally "j" shaped or hook-shaped cross-section. Seal 800' comprises first end portion 802'. First end portion 802' has a distal end 804'. This distal end defines edge 805'. Seal 800' further comprises a generally curled second end portion 806' that includes an arcuate or curved portion 807'. Second end portion 806' extends to distal end 808'. Distal end 808' defines edge 809'. Seal 800' further comprises central body portion 810' that is between and contiguous with first end portion 802' and second end portion 806'. In accordance with this embodiment of the invention, central body portion 810' is configured so that it has a curvature or "curving" geometry generally indicated by reference number 1100. Seal 800' has first side 820' and opposite second side 822'. Second end portion 806' curls in a first direction 830' in accordance with a predetermined radius of arcuate portion 807' such that distal end 808' is located across from first side 820' by a predetermined distance and distal ends 804' and 808' do not face each other.

Figure 16:
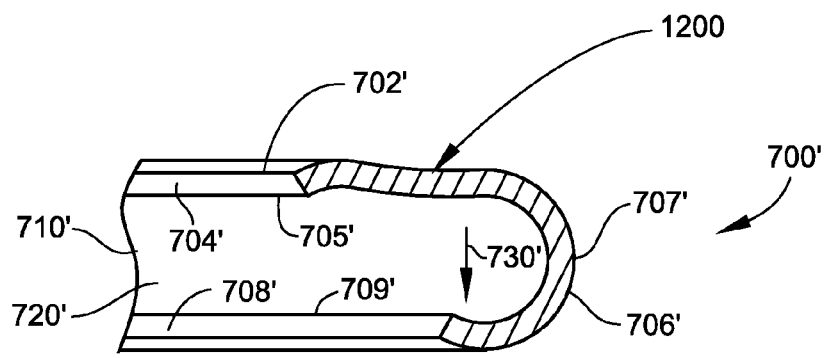
FIG. 16 is a cross-sectional view, similar to the view shown in FIG. 11C, of a seal in accordance with another embodiment of the present invention.

Referring to FIG. 16, there is shown seal 700' which is an alternate embodiment of seal 700 shown in FIGS. 11A, 11B and 11C. The view shown in FIG. 16 is a cross-sectional view that is similar to the view shown in FIG. 11C. Seal 700' has generally the same structure as seal 700 except seal 700' has a curvature. Seal 700' has a generally "j" shaped or hook-shaped cross-section. Seal 700' comprises first end portion 702'. First end portion 702' has a distal end 704'. Distal end defines edge 705'. Seal 700' further comprises a generally curled second end portion 706' that includes an arcuate or curved portion 707'. Second end portion 706' extends to distal end 708'. Distal end 708' defines edge 709'. Seal 700' further comprises central body portion 710' that is between and contiguous with first end portion 702' and second end portion 706'. In accordance with this embodiment, central body portion 710' is configured so that it has a curvature or a "curving" geometry generally indicated by reference number 1200. Seal 700' has first side 720' and an opposite second side (not shown). Second end portion 706' curls in a first direction 730' in accordance with a predetermined radius of arcuate portion 707' such that distal end 708' is located across from first side 720' by a predetermined distance and distal ends 704' and 708' do not face each other.

The material thickness of the seals can be varied at different locations on the seal and do not have to be uniform. Other modifications are possible.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Thus, it is to be understood that the invention is not limited to the illustrations described and shown herein, which are deemed to be merely illustrative of the best modes of carrying out the invention, and which are susceptible of modification of form, size, and arrangement of parts and details of operation. The invention is intended to encompass all such modifications which are within the spirit and scope as defined by the attached claims.

What is claimed is:

1. An annular axial seal comprising:
a central section comprising a first linear section which has a first end and a second end, a first side in a first plane and an opposite second side in a second plane, said second plane being substantially parallel to said first plane, wherein the first linear section does not have any inflection points formed therein, said central section having a frustro-conical shape;
a first portion contiguous with the first end of the first linear section and curving with respect to the first linear section in accordance with a first predetermined radius such that the first portion breaks the first plane, the first portion extending to a first end;
a second portion contiguous with the second end of the first linear section, the second portion comprising:
an arcuate portion that is contiguous with the second end of the first linear section and which curls in accordance with a second predetermined radius such that the arcuate portion breaks the first plane;
a second linear section contiguous with the arcuate portion such that the arcuate portion is between the first linear section and the second linear section, the second linear section having a predetermined length, a first side in a first plane and an opposite second side in a second plane that is substantially parallel to the first plane of the second linear section, wherein the first plane of the second linear section is located across from the first plane of the first linear section;
a curved end portion contiguous with the second linear section such that the second linear section is between the arcuate portion and the curved end portion, the curved end portion extending to a second end, the curved end portion curling inward in accordance with a third predetermined radius such that (i) the curved end portion breaks the plane of the first side of the second linear section, (ii) the second end is located directly across from the first side of said first linear section by a predetermined distance, and (iii) the first and second ends do not directly face each other, wherein the predetermined length of the second linear section and the second predetermined radius of the arcuate portion determine the predetermined distance which separates the second end from the first side of the first linear section; and
wherein the height from the arcuate portion to the first end of the first portion is greater than the height from the arcuate portion to the second end of the curved end portion.

2. The annular axial seal according to claim 1 wherein the annular axial seal is metallic.

3. The annular axial seal according to claim 2 wherein the annular axial seal is fabricated from a ductile, corrosion-resistant, high-strength metal.

4. An annular axial seal comprising:
a linear, central body portion comprising a first end and a second end, a first side in a first plane and an opposite second side in a second plane, said second plane being substantially parallel to said first plane, said linear, central body portion having a frustro-conical shape;
a first portion contiguous with the first end of the linear, central body portion and curving with respect to the linear, central body portion in accordance with a first predetermined radius such that the first portion breaks the first plane, the first portion extending to a first end;
a second portion contiguous with the second end of the linear, central body portion, the second portion comprising:
an arcuate portion that is contiguous with the second end of the linear, central body portion and which curls in accordance with a second predetermined radius, such that the arcuate portion breaks the first plane; a linear section contiguous with the arcuate portion such that the arcuate portion is between the linear, central body portion section and the linear section, the linear section having a predetermined length, a first side in a first plane and an opposite second side in a second plane that is substantially parallel to the first plane of the linear section, wherein the first plane of the linear section is located across from the first plane of the linear, central body portion;

a curved end portion contiguous with the linear section such that the linear section is between the arcuate portion and the curved end portion, the curved end portion extending to a second end, the curved end portion curling inward in accordance with a third predetermined radius such that (i) the curved end portion breaks the plane of the first side of the linear section, (ii) the second end is located directly across from the first side of the linear, central body portion by a predetermined distance and (iii) the first and second ends do not directly face each other, wherein the predetermined length of the linear section and the second predetermined radius of the arcuate portion determine the predetermined distance separating the second end from the first side of the linear, central body portion; and wherein the height from the arcuate portion to the first end of the first portion is greater than the height from the arcuate portion to the second end of the curved end portion.

5. An annular axial seal comprising:

a linear, central body portion comprising a first end and a second end, a first side in a first plane and an opposite second side in a second plane, said second plane being substantially parallel to said first plane, said linear, central body portion having a frustro-conical shape;

a first portion contiguous with the first end of the linear, central body portion and curving with respect to the linear, central body portion in accordance with a first predetermined radius such that the first portion breaks the first plane, the first portion terminating in a first, free annular edge;

a second portion contiguous with the second end of the linear, central body portion, the second portion comprising:

an arcuate portion that is contiguous with the second end of the linear, central body portion and which curls in accordance with a second predetermined radius, such that the arcuate portion breaks the first plane;

a linear section contiguous with the arcuate portion such that the arcuate portion is between the linear, central body portion section and the linear section, the linear section having a predetermined length, a first side in a first plane and an opposite second side in a second plane that is substantially parallel to the first plane of the linear section, wherein the first plane of the linear section is located across from the first plane of the linear, central body portion;

a curved end portion contiguous with the linear section such that the linear section is between the arcuate portion and the curved end portion, the curved end portion terminating in a second, free annular edge, the curved end portion curling inward in accordance with a third predetermined radius such that (i) the curved end portion breaks the plane of the first side of the linear section, (ii) the second, free annular edge is located directly across from the first side of the linear, central body portion by a predetermined distance and (iii) the first and second free annular edges do not directly face each other, wherein the predetermined length of the linear section and the second predetermined radius of the arcuate portion determine the predetermined distance separating the second, free annular edge from the first side of the linear, central body portion; and wherein the height from the arcuate portion to the first, free annular edge of the first portion is greater than the height from the arcuate portion to the second, free annular edge of the curved end portion.

* * * * *